(12) United States Patent
Wada et al.

(10) Patent No.: US 6,846,547 B2
(45) Date of Patent: Jan. 25, 2005

(54) FORGERY/ALTERATION PROTECTIVE MATERIAL

(75) Inventors: Masayoshi Wada, Yokohama (JP); Asa Kimura, Yokohama (JP)

(73) Assignee: Shiseido Co., Ltd., Tokyo (JP)

( * ) Notice: Subject to any disclaimer, the term of this patent is extended or adjusted under 35 U.S.C. 154(b) by 0 days.

(21) Appl. No.: 10/332,279

(22) PCT Filed: Jun. 29, 2001

(86) PCT No.: PCT/JP01/05629

§ 371 (c)(1),
(2), (4) Date: Jan. 7, 2003

(87) PCT Pub. No.: WO02/04221

PCT Pub. Date: Jan. 17, 2002

(65) Prior Publication Data

US 2003/0138609 A1 Jul. 24, 2003

(30) Foreign Application Priority Data

Jul. 10, 2000 (JP) .......................... 2000-208872

(51) Int. Cl.⁷ .......................... B32B 9/00; B42D 15/10
(52) U.S. Cl. .................. 428/195; 428/323; 428/699; 428/701; 428/702; 428/404; 428/405; 428/406; 428/407; 283/72
(58) Field of Search ................. 428/195, 323, 428/402, 402.24, 403, 913; 283/72, 94

(56) References Cited

U.S. PATENT DOCUMENTS 5,169,707 A   12/1992 Faykish et al.
6,000,804 A * 12/1999 Kimura ...................... 359/536
6,060,157 A *  5/2000 LaPerre et al. .............. 428/325
6,166,856 A * 12/2000 Araki et al. ................. 359/627
6,200,666 B1 * 3/2001 Christian et al. ........ 428/195.1

FOREIGN PATENT DOCUMENTS

JP   60-232503 A   11/1985
JP   6-507737 A    9/1994

* cited by examiner

Primary Examiner—Stephen Stein
Assistant Examiner—G. Blackwell-Rudasill
(74) Attorney, Agent, or Firm—Fei-Fei Chao; Bingham McCutchen LLP

(57) ABSTRACT

The purpose of the invention is to provide a forgery/alteration protective material which containing a retroreflecting material and having an improved forgery/alteration protecting effect against the process of the upper part of the material.

In order to achieve the above purpose, the forgery/alteration protective material 2 according to the invention where a retroreflecting material 4 for returning the incident light substantially along the path along which the incident light travels is provided and a transparent film 6 is layered on the retroreflecting material 4 is characterized in that a low transmittance layer 8 formed of a material having a lowerer light transmittance than that of the transparent film 6 is provided between the retroreflecting material 4 and the transparent film layer 6, and the light transmittance of the low transmittance layer 8 is 45% or higher to the light in the wavelength range of 420 nm to 700 nm.

20 Claims, 14 Drawing Sheets (a)

(b)

(a)

(b)

(c)

(a)

(b)

(a)

(b)

(c)

(d)

(a)

(b)

FORGERY/ALTERATION PROTECTIVE MATERIAL

RELATED APPLICATIONS

This application claims priority to the Japanese Patent Application 2000-208872 dated on Jul. 10, 2000 and is hereby incorporated with reference for all purposes.

BACKGROUND OF THE INVENTION

1. Field of the Invention

The invention relates to a forgery/alteration protective material, particularly to improvement of a forgery/alteration protective material made information-readable under specified situations using a material with a low light transmittance.

2. Prior Art

A product produced by a specified enterprise is highly evaluated and is regarded as reliable by consumers if a brand name is attached thereto. Such a brand name stimulates the brand preference of consumers and even produces new added values.

However, taking advantage of the reliance and the preference of consumers, there exist some people who try to gain profit by falsely applying the brand name popular among consumers to the products. Forged products sold in markets by such people are often significantly inferior in the quality and accordingly ruin the reliability obtained with much effort among consumers and that is a serious problem for the enterprise.

Therefore, in order to avoid such a trouble, circulation of forged products has been tried to stop by adding technology for making forgery difficult and technology for distinguishing between intrinsic products and forged products.

As such a technology to be added to a product for the purpose to prevent forgery, there are technological means available using retroreflecting materials and multivariably discoloring pearl pigments. FIG. 14 shows a schematic illustration of a forgery protective material using a retroreflecting material.

As shown in the illustration, a forgery protective material 100 using a conventional retroreflecting material comprises a substrate 102, a retroreflecting material layer 104 and a transparent film layer 106 layered thereon and a photographic information 108 and/or letter information 110 by printing is inserted between the retroreflecting material layer 104 and the transparent film layer 106.

The illustrated retroreflecting material layer 104 is composed of a substrate 112, an interfering substance layer 114, and a transparent small spherical body 116. And under normal light such as sunray and illumination, light rays is irradiated from a variety of directions to the retroreflecting material, so that light scattering takes place in the respective layers and neither retroreflective light nor interference color by the interfering substance layer 114 is observed. And when light rays with a uniform proceeding direction (called as linear light) are irradiated, interfering color is observed owing to the retroreflection and the interference of light rays in the transparent small spherical body 116 and the interfering substance layer 114 and accordingly, distinction between an intrinsic product and a forged product is made possible by making letters and/or designed patterns, which differ under normal light irradiation and linear light irradiation, appear in the interfering substance layer.

If fabrication of the retroreflecting material 104 of a forgery protective material 100 is tried, the formation state of the substrate 112, the interfering substance layer 114, and the transparent small spherical body 116 composing the retroreflecting material layer is broken to make it difficult to re-construct the formation state, so that actually fabrication is to be considerably difficult. Further, it is extremely difficult to reproduce designed patterns and/or letters observed in the interfering substance layer 114 under normal light or linear light irradiation and that significantly contributes to forgery prevention.

However, in the case of a conventional forgery/alteration protective material with the constitution as shown in FIG. 14, it has been possible to fabricate the photographic information 108 and/or the letter information 110 by scratching the transparent film layer 106, falsifying the photographic information 108 and/or the letter information 110, and coating them with a transparent film just like before. Further, even if the photographic information 108 and/or the letter information 110 are altered, the retroreflecting material layer 104 still maintains the information and it makes judgment of the falsification extremely difficult. If the retroreflecting material layer 104 is obtained easily, forgery of such a conventional forgery/alteration protective material itself is easily done. Therefore, a conventional forgery/alteration protective material is inferior in security property in terms of processing of the top part of the material.

SUMMARY OF THE INVENTION

The invention aims to provide a forgery/alteration protective material using a retroreflecting material, wherein the forgery/alteration protective material is provided with improved forgery/alteration protecting effect against the process of the upper part of the material.

In order to achieve the above-mentioned purpose, a forgery/alteration protective material according to the invention where a retroreflecting material for returning the incident light substantially along the path along which the incident light travels is provided and a transparent film is layered on said retroreflecting material, wherein a low transmittance layer formed of a material having a lowerer light transmittance than that of said transparent film is provided between said retroreflecting material and said transparent film layer or on the surface of said transparent film layer, and the light transmittance of said low transmittance layer is 45% or higher to the light in the wavelength range of 420 nm to 700 nm.

Further, in the forgery/alteration protective material of the invention, it is preferable that information such as letters and/or designed patterns by printing, a photograph or the like is recorded between the retroreflecting material and the low transmittance layer or in the retroreflecting material.

Further, in the forgery/alteration protective material of the invention, it is preferable that the retroreflecting material is a color light retroreflecting material for turning color light with different color tone from that of the incident light in the proceeding direction of the incident light.

Further, in the forgery/alteration protective material of the invention, it is preferable that the material with a low light transmittance for forming the low transmittance layer is a material with a high light diffusibility as compared with that of the transparent film.

Further, in the forgery/alteration protective material of the invention, it is preferable that the material with a high light diffusibility is a spherical inorganic powder such as a spherical silica, spherical alumina, and the like, or a spherical resin powder such as spherical polymethyl methacrylate, spherical polyethylene, spherical silicone and the like.

Further, in the forgery/alteration protective material of the invention, it is preferable that the material with a low light transmittance for forming the low transmittance layer is a material with a high light shielding property as compared with that of the transparent film.

Further, in the forgery/alteration protective material of the invention, it is preferable that the material with a high light shielding property as compared with that of the transparent film is an inorganic substance such as titanium oxide, zinc oxide, iron oxide, titanium oxide-coated mica, and the like or a metal such as aluminum, gold and the like.

Further, in the forgery/alteration protective material of the invention, it is preferable for the material to be stuck to or integrally formed in a substrate such as paper, a film and the like or an article.

DETAILED DESCRIPTION OF THE PREFERRED EMBODIMENT

Hereinafter, with reference to one embodiment of the invention, a forgery/alteration protective material of the invention will be described in details.

Figure 1:
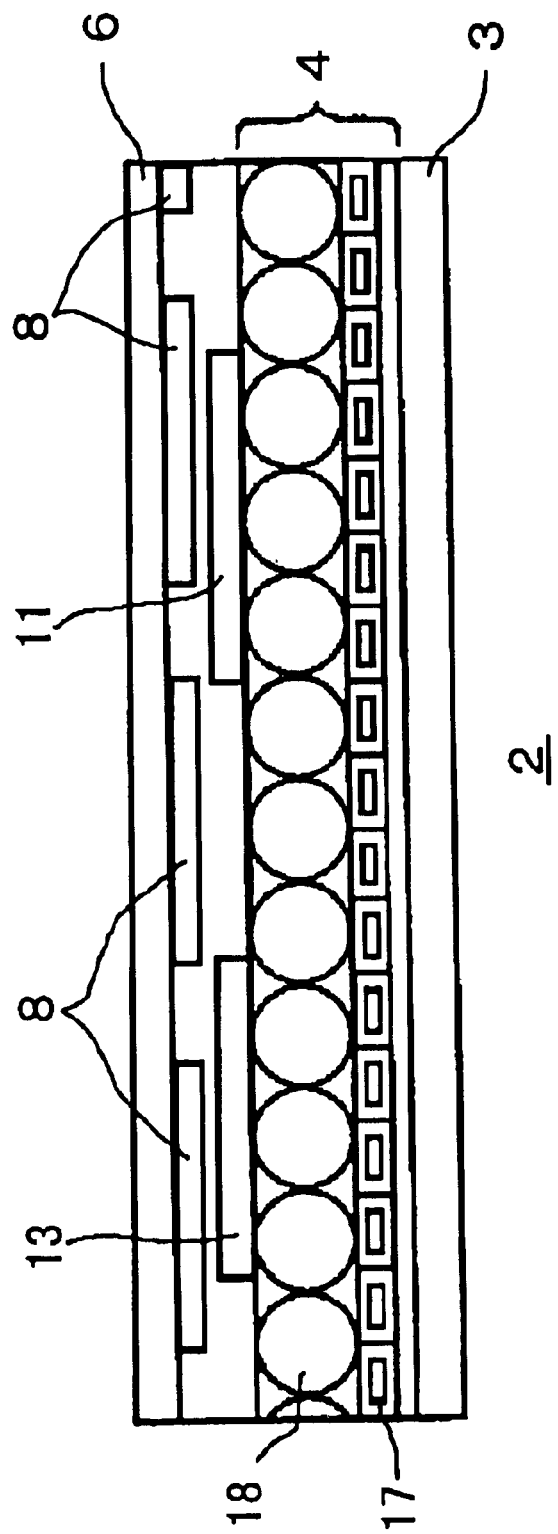
FIG. 1 is a cross-sectional view of one embodiment of a forgery/alteration protective material of the invention.

FIG. 1 shows a cross-sectional view of one embodiment of a forgery/alteration protective material of the invention. A forgery/alteration protective material 2 shown in the illustration comprises a retroreflecting material 4, which is stuck to a substrate 3 and turns the incident light rays back in approximately the proceeding direction of the incident light and a transparent film 6 layered on the retroreflecting material 4, and the material is provided with a low transmittance layer 8 produced from a material with a low light transmittance as compared with the transparent film 6 and formed between the retroreflecting material 4 and the transparent film layer 6. Incidentally, as shown in FIG. 1, the low transmittance layer 8 of the invention is not necessarily required to be a layer covering entirely one face of the forgery/alteration protective material.

As materials with a low light transmittance as compared with that of the transparent film 6 and forming the low transmittance layer 8, they can be classified into two types; one is a material with a high light diffusibility as compared with the transparent film and the other is a material with a light shielding property as compared with the transparent film.

The forgery/alteration protective material of the invention having such a constitution behaves differently in the case of normal light irradiation and in the case of linear light irradiation.

Here, the names of light rays employed in this specification will be defined. The normal light, as described in the foregoing section of Prior Art, means light rays existing under sunrays, illumination light of a fluorescent lamp and the like and having various wavelength values and a variety of light proceeding directions, whereas linear light means light rays with a uniform processing direction even though their wavelength varies. In this regard, coherent light such as laser beam can be said to be linear light with special state and in this specification, laser beam is included as linear light.

When these two types of light rays defined above are irradiated to such a forgery/alteration protective material of the invention as shown in FIG. 1, the material shows the following behaviors. Incidentally, since the behaviors differ slightly in the case of using a material with a high light diffusibility and using a material with a high light shielding property as a material with a low light transmittance, these will be described separately.

Figure 2:
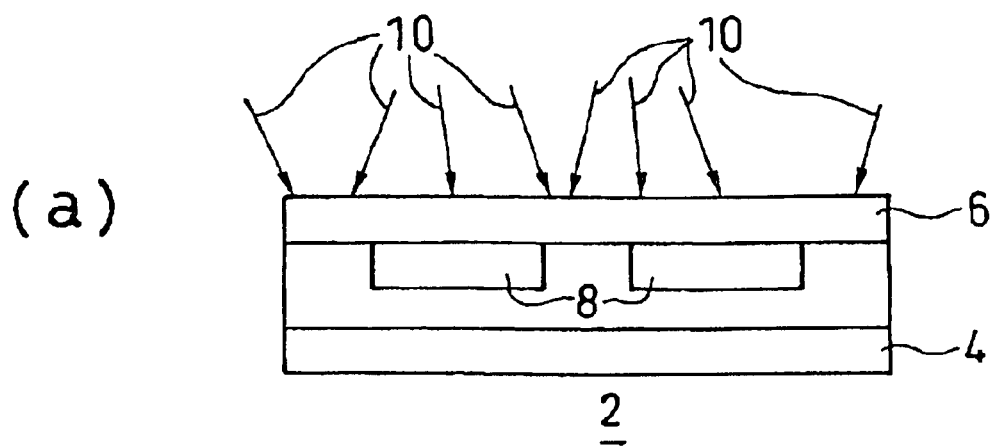
FIG. 2 is an explanatory drawing for representing the behavior of a forgery/alteration protective material using a material with a high light diffusibility as a material with a low light transmittance under normal light irradiation.
Figure 2:
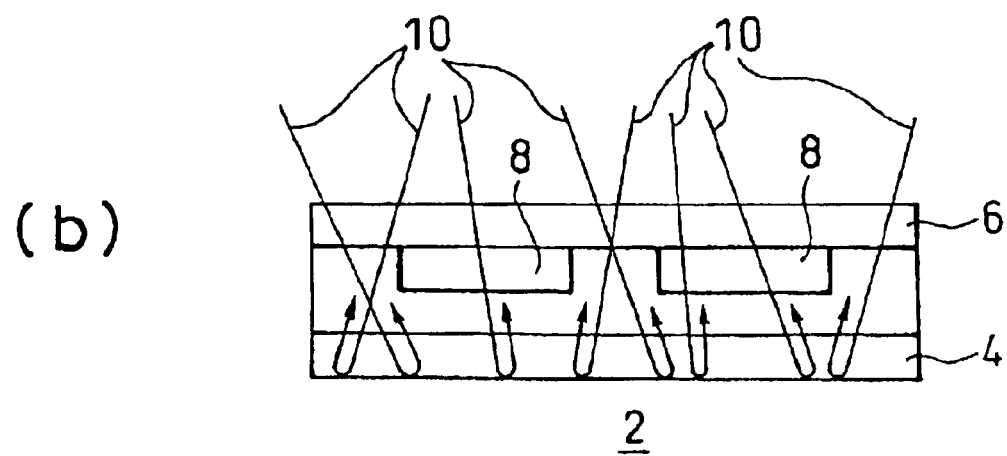
Figure 2:
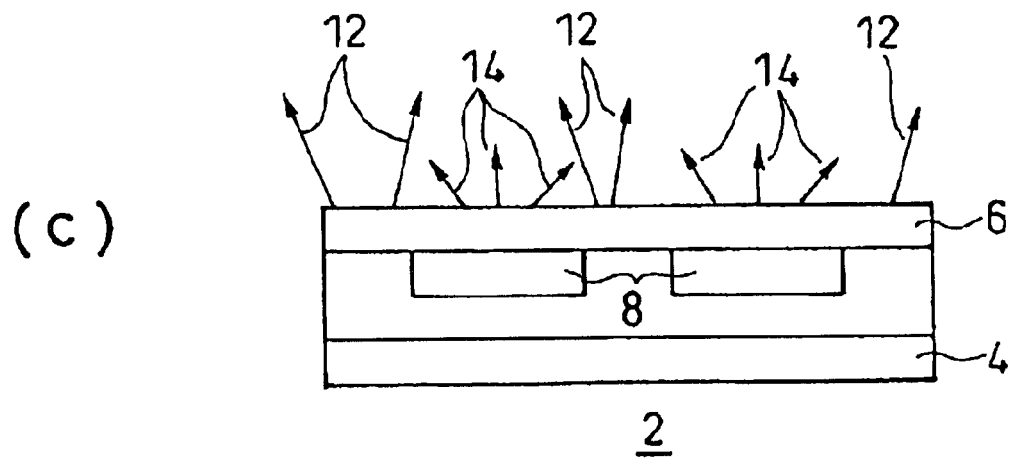

FIG. 2 is an explanatory drawing for representing the behavior of a forgery/alteration protective material using a material with a high light diffusibility as a material with a low light transmittance under normal light irradiation and a cross-sectional schematic view showing one embodiment of the forgery/alteration protective material of the invention. Incidentally, same symbols are assigned to the portions in this illustration which correspond to the same constituents in FIG. 1 to omit their explanation.

As illustrated in FIG. 2(a), light rays 10 come to the forgery/alteration protective material 2 of the invention in various directions under normal light irradiation. The light rays 10 irradiating on the forgery/alteration protective material 2 of the invention passes through the transparent film layer 6 and a low transmittance layer 8 as illustrated in FIG. 2(b) come to the retroreflecting material layer 4 and are reflected in the approximately same incident light proceeding directions. Then, as illustrated in FIG. 2(c), the reflected light rays which become retroreflected light rays 12 again pass the transparent film layer 6 and are turned back in the approximately same incident light proceeding directions and dissimilarly to the retroreflected light rays 12, the reflected light rays which come to the low transmittance layer 8 are diffused in various directions to be diffused light rays 14 by the material with a high light diffusibility forming the low transmittance layer 8 during the turning back.

However, even if such a situation is observed with eyes, since the incident light rays 10 have various incident directions, the retroreflected light rays 12 also have various proceeding directions and therefore, the light rays 14 diffused by the low transmittance layer 8 and the retroreflected light rays 12 cannot be clearly distinguished.

Accordingly, in the case of observing the forgery/alteration protective material of the invention with eyes under normal light irradiation, the low transmittance layer becomes a layer which cannot be practically seen.

Figure 3:
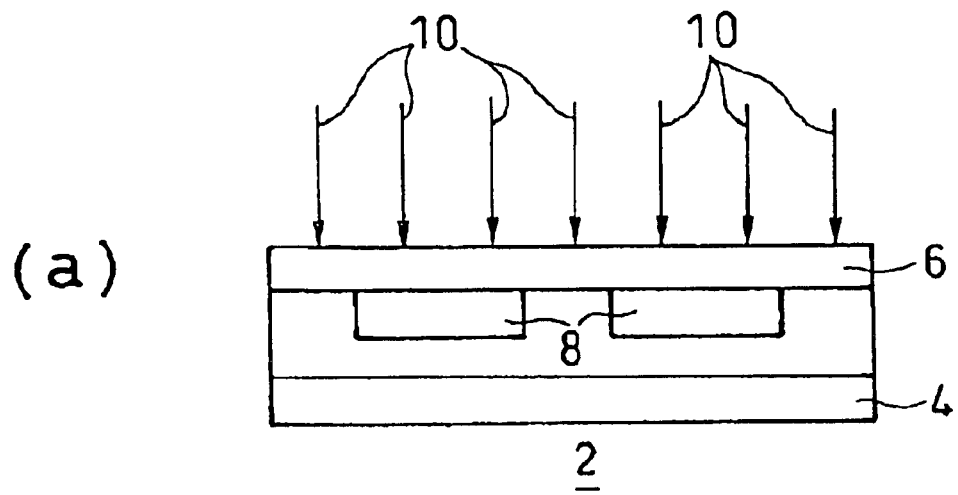
FIG. 3 is an explanatory drawing for representing the behavior of a forgery/alteration protective material using a material with a high light diffusibility as a material with a low light transmittance under linear light irradiation.
Figure 3:
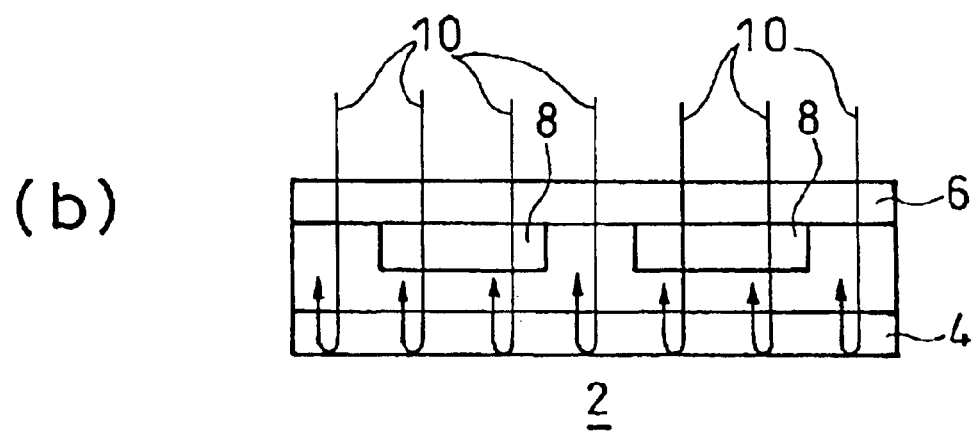
Figure 3:
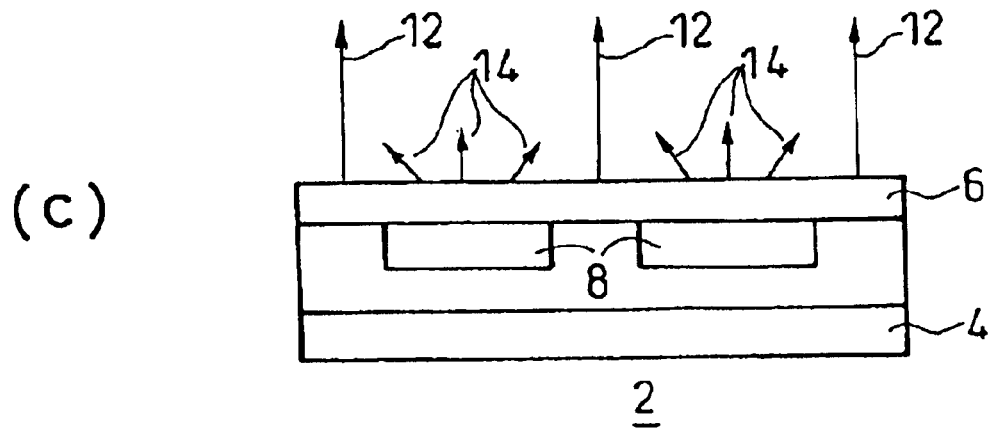

On the other hand, the material shows the following behavior when linear light rays are irradiated. FIG. 3 is an explanatory drawing for representing the behavior of a forgery/alteration protective material using a material with a high light diffusibility as a material with a low light transmittance under linear light irradiation and a cross-sectional schematic figure showing one embodiment of the forgery/alteration protective material of the invention. Incidentally, same symbols are assigned to the portions in this illustration which correspond to the same constituents in FIG. 2 to omit their explanation.

As illustrated in FIG. 3(a), light rays 10 come to the forgery/alteration protective material 2 of the invention only in one direction under linear light irradiation. The light rays 10 irradiating on the forgery/alteration protective material 2 of the invention, as illustrated in FIG. 3(b), passes through the transparent film layer 6, and at the time of passing the low transmittance layer 8, while some being diffused, light rays come to the retroreflecting material layer 4 and are reflected in the approximately same incident light proceeding directions. Then, as illustrated in FIG. 3(c), the reflected light rays which become retroreflected light rays 12 again pass the transparent film layer 6 and are turned back in the approximately same incident light proceeding directions and dissimilarly to the retroreflected light rays 12, the reflected light rays which come to the low transmittance layer 8 are diffused in various directions to be diffused light rays 14 by the material with a high light diffusibility forming the low transmittance layer 8 during the turning back.

When such a situation is observed with eyes from the approximately linear light irradiation direction, since the retroreflected light rays 12 proceed toward the observing eyes to make observation extremely bright. However, the light rays 14 diffused by the low transmittance layer 8 proceed in various proceeding directions and light rays which proceed toward eye direction are significantly decreased. For this reason, the low transmittance layer 8 is seen dark with eyes.

Accordingly, in the case of the forgery/alteration protective material of the invention using the material with a high light diffusibility as the material with a low light transmittance, the low transmittance layer 8 cannot be practically seen under normal light irradiation and therefore can be used for secret information.

Figure 4:
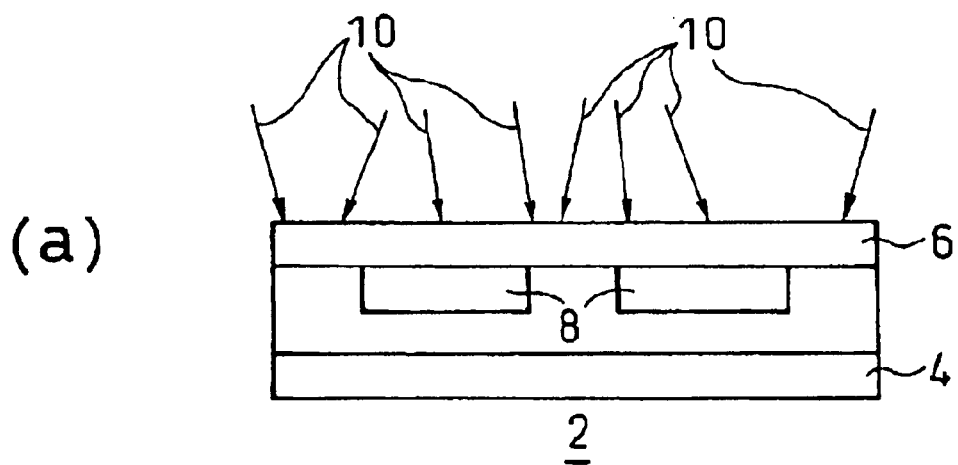
FIG. 4 is an explanatory drawing for representing the behavior of a forgery/alteration protective material using a material with a high light shielding property as a material with a low light transmittance under normal light irradiation.
Figure 4:
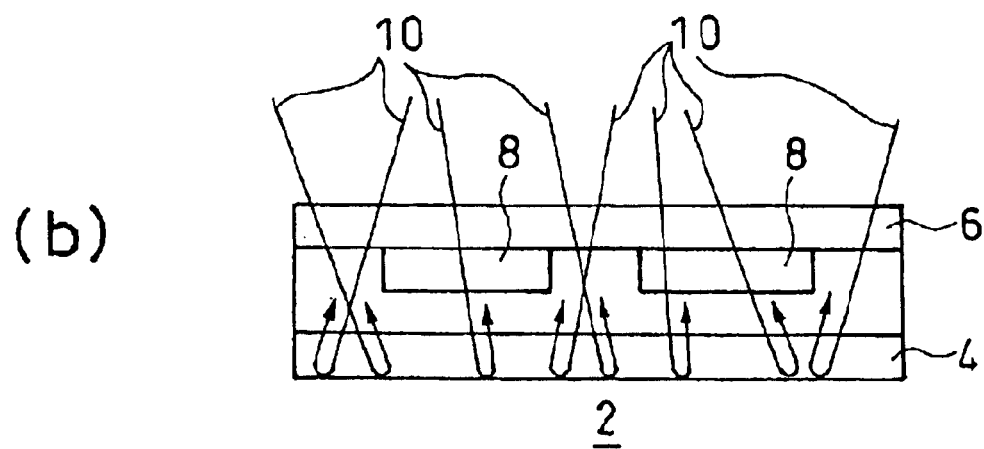
Figure 4:
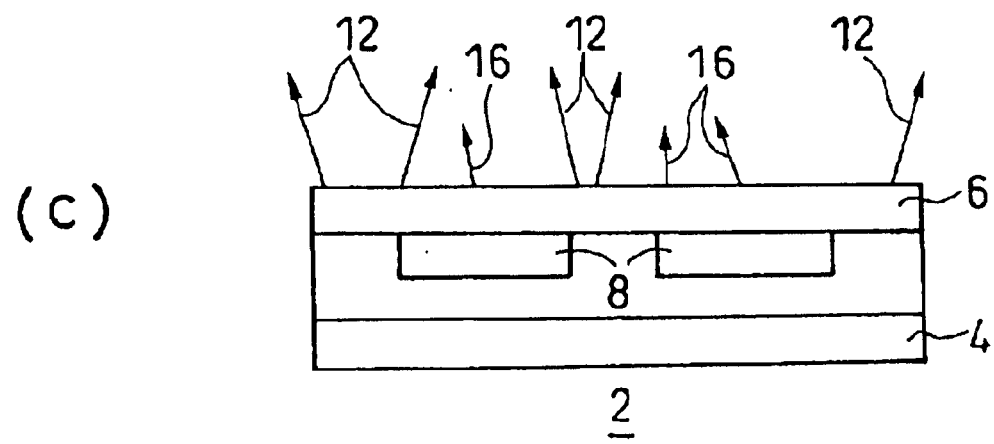

Next, a forgery/alteration protective material using the material with a material with a high light shielding property as the material with a low light transmittance will be described. FIG. 4 is an explanatory drawing for representing the behavior of a forgery/alteration protective material using a material with a high light shielding property as a material with a low light transmittance under normal light irradiation and a cross-sectional schematic view showing one embodiment of the forgery/alteration protective material of the invention. Incidentally, same symbols are assigned to the portions in this illustration which correspond to the same constituents in FIG. 2 to omit their explanation.

As illustrated in FIG. 4(a), light rays 10 come to the forgery/alteration protective material 2 of the invention in various directions under normal light irradiation. The light rays irradiating on the forgery/alteration protective material 2 of the invention passes through the transparent film layer 6 and a low transmittance layer 8 as illustrated in FIG. 4(b) come to the retroreflecting material layer 4 and are reflected in the approximately same incident light proceeding directions. Then, as illustrated in FIG. 4(c), the reflected light rays which become retroreflected light rays 12 again pass the transparent film layer 6 and are turned back in the approximately same incident light proceeding directions and dissimilarly to the retroreflected light rays 12, the reflected light rays which come to the material with a low light transmittance 8 during the turning back become retroreflected light rays 16 with light intensity of the reflected light decreased by the material with a high light shielding property forming the low transmittance layer 8.

When such a situation is observed with eyes, although the low transmittance layer 8 can be observed with eyes, if a high design property is provided by a material forming the low transmittance layer, the forgery/alteration protective material 2 itself is provided with a high design property.

Accordingly, in the case of observing the forgery/alteration protective material of the invention with eyes under normal light irradiation, the low transmittance layer becomes a layer which improves the design property of the forgery/alteration protective material.

Figure 5:
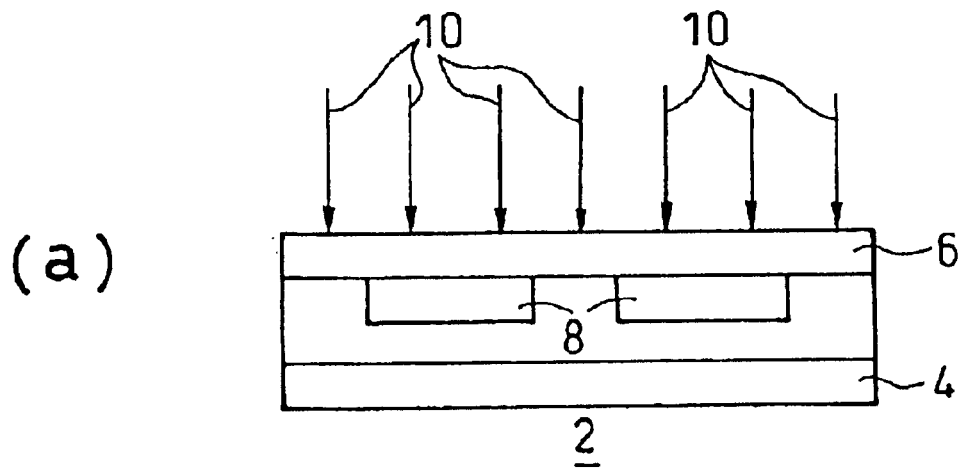
FIG. 5 is an explanatory drawing for representing the behavior of a forgery/alteration protective material using a material with a high light diffusibility property as a material with a low light transmittance under linear light irradiation.
Figure 5:
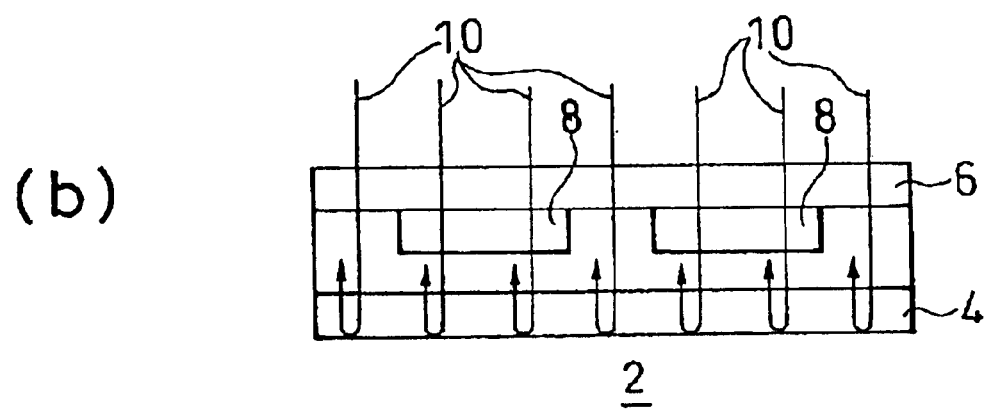
Figure 5:
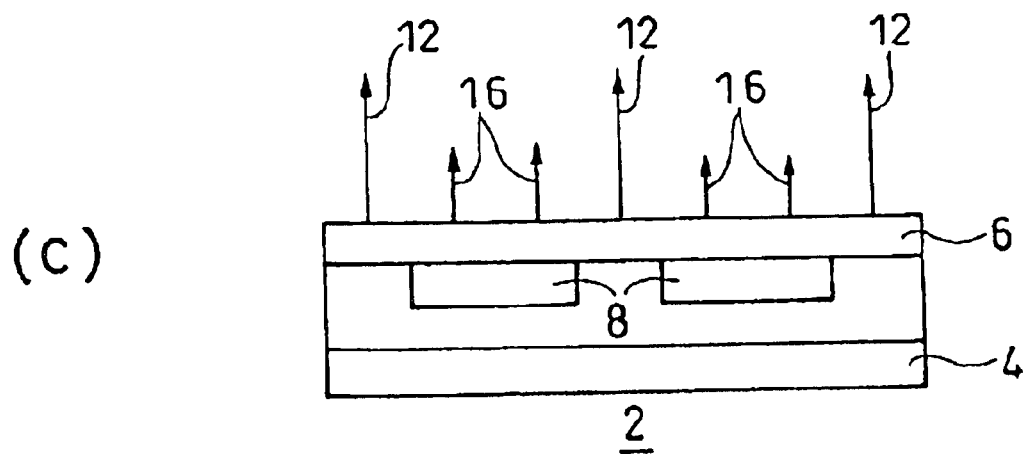

On the other hand, the material shows the following behavior when linear light rays are irradiated. FIG. 5 is an explanatory drawing for representing the behavior of a forgery/alteration protective material using a material with a high light shielding property as a material with a low light transmittance under linear light irradiation and a cross-sectional schematic view showing one embodiment of the forgery/alteration protective material of the invention. Incidentally, same symbols are assigned to the portions in this illustration which correspond to the same constituents in FIG. 2 to omit their explanation.

As illustrated in FIG. 5(a), light rays 10 come to the forgery/alteration protective material 2 of the invention only in one direction under linear light irradiation. The light rays 10 irradiating on the forgery/alteration protective material 2 of the invention, as illustrated in FIG. 5(b), passes through the transparent film layer 6, and at the time of passing the low transmittance layer 8, while some being shielded, the light rays come to the retroreflecting material layer 4 and are reflected in the approximately same incident light proceeding directions. Then, as illustrated in FIG. 5(c), the reflected light rays which become retroreflected light rays 12 again pass the transparent film layer 6 and are turned back in the approximately same incident light proceeding directions and dissimilarly to the retroreflected light rays 12, the reflected light rays which come to the low transmittance layer 8 during the turning back become retroreflected light rays 16 with light intensity of the reflected light decreased by the material with a high light shielding property forming the low transmittance layer 8.

When such a situation is observed with eyes from the approximately linear light irradiation direction, since the retroreflected light rays 12 proceed toward the observing eyes to make observation extremely bright. However, with respect to the retroreflected light rays 16 whose light intensity is decreased by the low transmittance layer 8, light rays which proceed toward eye direction are significantly decreased. For this reason, the low transmittance layer 8 is seen dark with eyes.

Accordingly, in the case of the forgery/alteration protective material of the invention using the material with a high light shielding property as the material with a low light transmittance, the low transmittance layer 8 can be a layer provided with high design property under normal light irradiation and in the case of linear light irradiation, its portion becomes dark and therefore the forgery/alteration protective material can be used for secret information.

As described, since the forgery/alteration protective material of the invention shows different behaviors depending on whether the light irradiated is normal light or linear light, whether a product is a forged one or not can be judged by using linear light. Further, even if the transparent film layer 6 is peeled or scratched for falsification, the low transmittance layer 8 is broken together with the transparent film layer 6, so that even if the transparent film layer 6 is restored, the alteration fact can be known because of the alteration of the observation state of the low transmittance layer when linear light is irradiated.

Incidentally, in order to reliably break the low transmittance layer 8 simultaneously with the peeling and breaking of the transparent film layer 6 in the outermost layer, it is preferable to form the transparent film layer in the outermost layer and the low transmittance layer in neighboring state.

The forgery/alteration protective material of the invention, as described above, is intended to make it possible to distinguish between an intrinsic product and a forged product depending on the difference between the intensity of light which passes the low transmittance layer and the intensity of light which does not pass the low transmittance layer when linear light is irradiated. Further, the low transmittance layer is required to be a layer unseen under normal light or capable of providing a high design property. Therefore, the light transmittance of the low transmittance layer 8 in the invention is preferable to be 45% or higher for the light with wavelength in a wavelength range from 420 nm to 700 nm, more preferable to be 50% or higher for the light with wavelength in a wavelength range from 420 nm to 700 nm.

If the transmittance is lower than that, it becomes difficult to recognize the letter information and/or the photographic information formed in an underlayer of the low transmittance layer. Further, the reason for limiting the wavelength range of the light to 420 nm to 700 nm is because this wavelength range approximately coincides with the wavelength range of visible light.

As the transparent film, materials such as polypropylene (PP), polyethylene terephthalate (PET), polycarbonate (PC) and the like can be used and embodiments of hologram and a light diffraction recording film may be included.

Here, some examples of a material with a high light diffusibility as compared with the transparent film include spherical inorganic powder such as a spherical silica, spherical alumina, and the like, or a spherical resin powder such as spherical polymethyl methacrylate, spherical polyethylene, spherical silicone and the like. They have high transparency and high light diffusibility and accordingly are provided with un-visibility under normal light and light diffusibility under linear light and thus remarkably advantageous for use.

Although hard to say in general since it depends on the refractive index, the particle diameter of the spherical inorganic powder and the spherical resin powder forming the low transmittance layer is preferably 1 $\mu$m to 20 $\mu$m.

In the case of using such a spherical inorganic powder or a spherical resin powder to form the low transmittance layer, it is preferable to form the respective spherical bodies such that they are arranged orderly since light diffusion takes place without unevenness.

Figure 6:
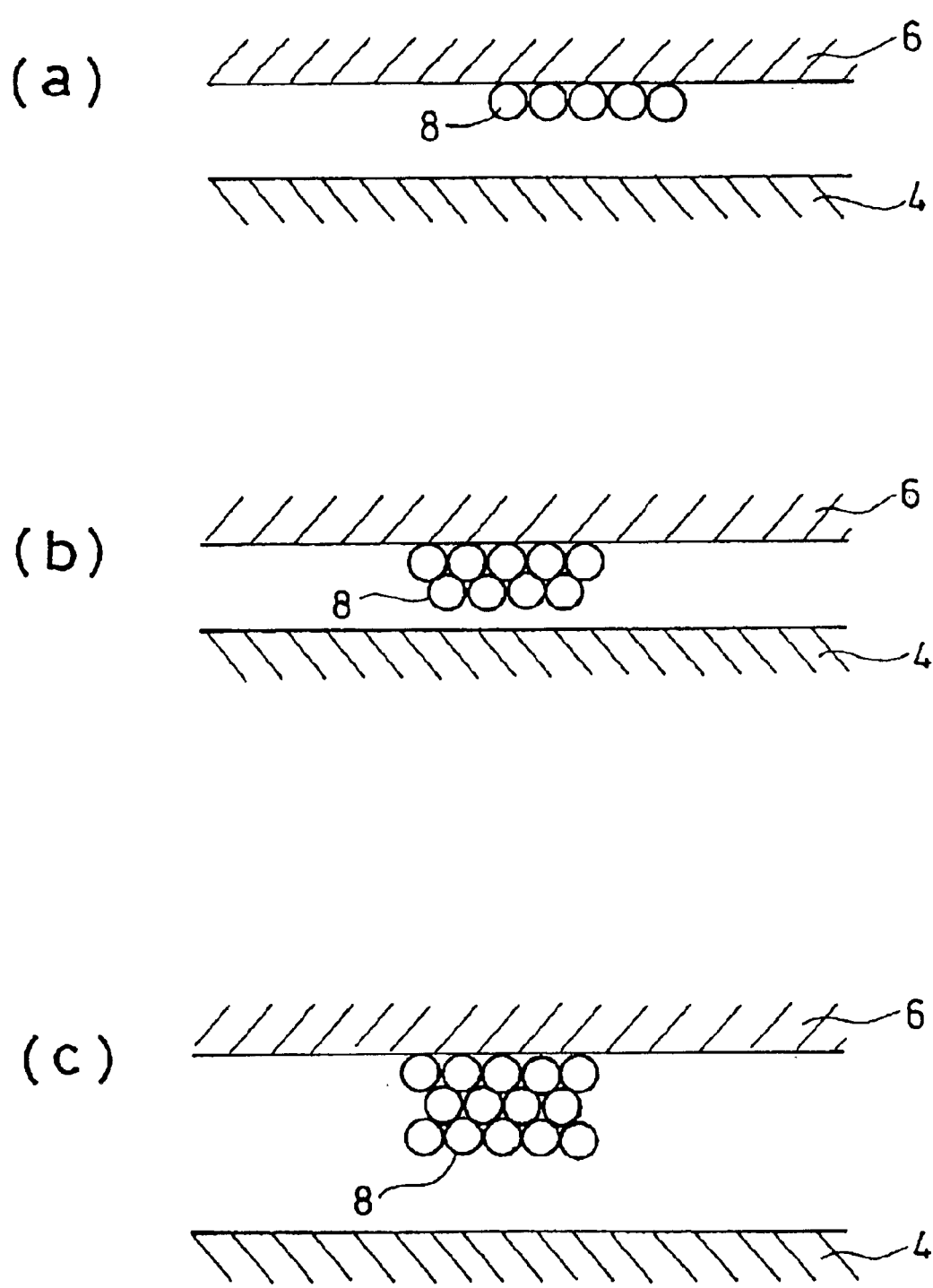
FIG. 6 is a cross-sectional schematic view for illustrating the formation state of a low transmittance layer in the case the low transmittance layer is formed using a spherical inorganic powder or a spherical resin powder.

FIG. 6 is a cross-sectional schematic view for illustrating the formation state of a low transmittance layer in the case the low transmittance layer is formed using a spherical inorganic powder or a spherical resin powder. Incidentally, same symbols are assigned to the portions in this illustration which correspond to the same constituents in FIG. 1 to omit their explanation. As shown in FIG. 6(a), the low transmittance layer 8 formed from a spherical powder is formed between a retroreflecting material layer 4 and a transparent film layer 6 while the respective spherical bodies are arranged orderly so as to form a monolayer.

Incidentally, that the respective spherical bodies are arranged orderly does not mean the respective spherical bodies are arranged in a monolayer so as to form the low transmittance layer but, as shown in FIG. 6(b) and FIG. 6(c), may be formed in a plurality of layers such as 2 layers, 3 layers and the like.

However, if too many layers are formed, although the light diffusibility is not so much improved, it results in deterioration of the transparency or undesirable effects on the strength of the material itself and therefore, in the case of forming the low transmittance layer in the invention by using the spherical inorganic powder or the spherical resin powder, the thickness of the low transmittance layer is preferably 1 $\mu$m to 20 $\mu$m.

Examples of the material with a high light shielding property as compared with the transparent film include titanium oxide, zinc oxide, iron oxide, titanium oxide-coated mica, and the like or a metal such as aluminum, gold and the like. They can provide the high design property to the forgery/alteration protective material under normal light. Further, since the light transmittance can be increased also by adjusting the layer formation state, the light which passes the low transmittance layer is more than the light reflected in the surface of the low transmittance layer under linear light and consequently, the layer works as a layer for decreasing the light intensity at the time when the returning light by the retroreflecting material layer 4 passes the low transmittance layer and makes it possible to display secret information.

In the case of using an inorganic substance such as titanium oxide, zinc oxide, iron oxide, titanium oxide-coated mica, and the like as the material for forming the low transmittance layer, although hard to say in general since it depends on the refractive index, the reflectivity in the surface, the transparency of the material itself, and the like, the average particle diameter is preferably 0.01 $\mu$m to 10 $\mu$m in the case the powder is spherical or agglomerate and the thickness is preferably 0.2 $\mu$m to 10 $\mu$m in the case the powder is plate-like.

Further, in the case of using a material with a high light shielding property for the low transmittance layer, the layer thickness is very important since it directly affects the light transmittance of the low transmittance layer. Accordingly, in the case of forming the low transmittance layer by using a material with a relatively high light transmittance such as titanium oxide, titanium oxide-coated mica and the like, the thickness of the low transmittance layer is preferably 1 μm to 20 μm, further preferably 1 μm to 10 μm.

In the case of forming the low transmittance layer by using a material with a relatively low light transmittance such as zinc oxide, iron oxide, and the like, or a metal with light reflectivity such as aluminum, gold and the like, although depending on the refractive index, the reflectivity the material itself, the layer thickness is preferably 50 Å to 300 Å, further preferably 100 Å to 200 Å since the material remarkably decreases the light transmittance as the thickness increases.

In the case of using a material with a high light shielding property for the low transmittance layer, if the layer thickness is thinner than the above-mentioned limit, sufficient design property cannot be provided, whereas the thickness is thicker, the light transmittance is so low to make it difficult to recognize the letter information and the photographic information, which are formed in the underlayer of the low transmittance layer.

In the invention, it is preferable to form information such as letters and designed patterns by printing, or a photograph or the like between the retroreflecting material and the low transmittance layer.

Again using FIG. 1, the invention will be described. As shown in the illustration, in this embodiment, photographic information 11 and letter information 13 are inserted between the retroreflecting material 4 and the low transmittance layer 8. With such a constitution, when it is tried to alter the photographic information 11 and the letter information 13 with other photograph or letters, either the retroreflecting material layer 4 or the transparent film layer 6 with the low transmittance layer 8 has to be broken once. However, once the retroreflecting material layer 4 and the low transmittance layer 8 are broken, it becomes very difficult to restore them and even if the photographic information and the letter information are altered, the alteration fact can be easily found owing to the change of the state observed under linear light to make alteration of the photographic information and letter information practically impossible.

Further, in the forgery/alteration protective material of the invention, the retroreflecting material is preferable to be a color light retroreflecting material for turning color light with different color tone from that of the incident light in the proceeding direction of the incident light. If such a retroreflecting material is used, since the color tone of the retroreflecting material is observed differently under normal light and under linear light, high security property is provided.

As such a retroreflecting material, a retroreflecting material having an interfering substance layer can be exemplified. In the embodiment shown in FIG. 1, the color light retroreflecting material for turning color light with different color tone from that of the incident light in the proceeding direction of the incident light is composed of a titanium dioxide-coated mica layer 17 as the interfering substance layer, and a transparent small spherical body 18 for turning back incident light in the incident light proceeding direction on the titanium dioxide-coated mica layer 17. The mechanism for coloring the incident light by the retroreflecting material with such a constitution will be described.

Figure 7:
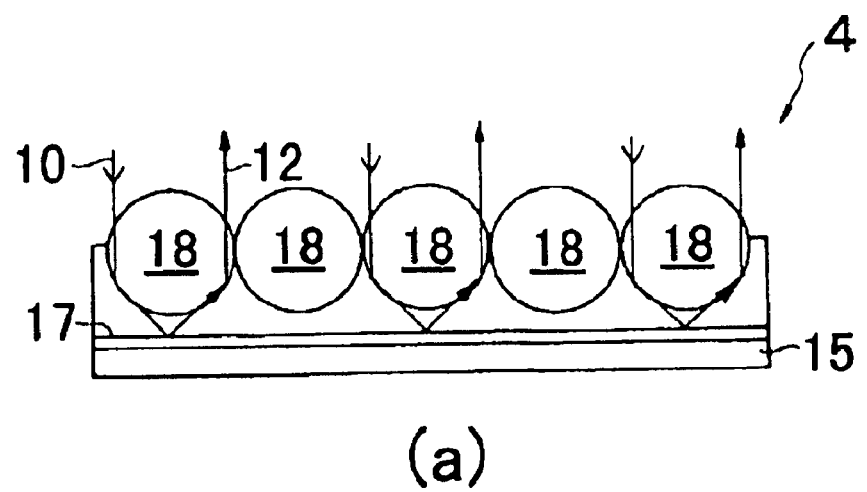
FIG. 7 is an explanatory drawing for representing the constitution of a color light retroreflecting material for turning the color light back in the incident light proceeding direction.
Figure 7:
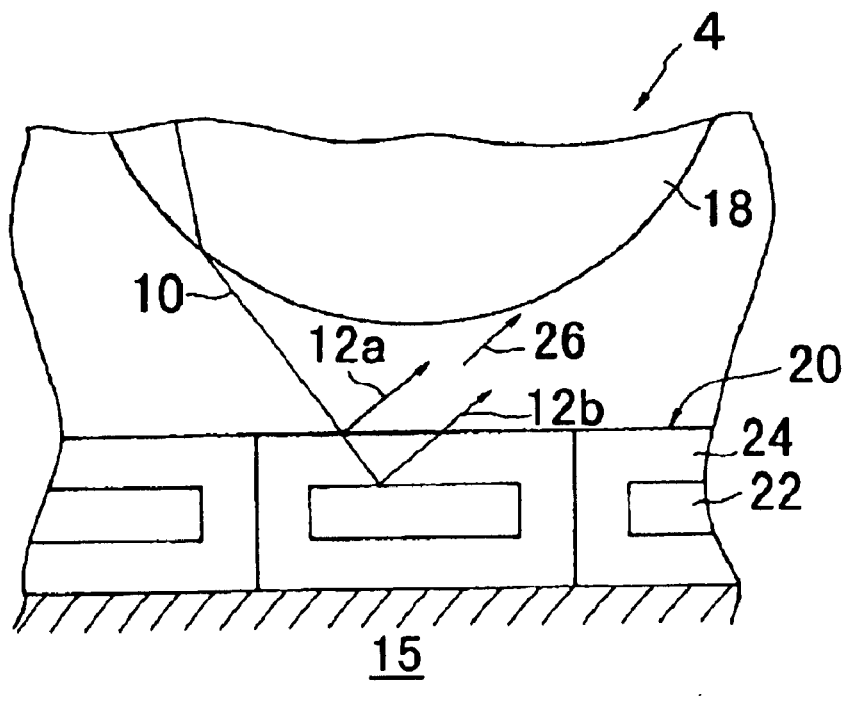

FIG. 7 shows an explanatory drawing for representing the constitution of a color light retroreflecting material for turning the color light back in the incident light proceeding direction. Incidentally, same symbols are assigned to the portions in this illustration which correspond to the same constituents in FIG. 1 to omit their explanation.

As shown in FIG. 7(a), the retroreflecting material 4 comprises a titanium dioxide-coated mica layer 17, as the interfering substance layer, on a substrate 15 and a large number of transparent small spherical bodies 18 with a particle diameter of 30 μm to 80 μm, made of glass or the like and arranged orderly in the surface layer side.

The incident light 10 coming outside enters into the small spherical bodies 18. At least some of the light rays are reflected by the interfering substance layer 17 from the transparent small spherical bodies 18, and again turned back to the small spherical bodies 18 and proceed outward. Since the faces of the small spherical bodies 18 projected outward are spherical faces, even if the incident angle is fluctuated more or less, same action is caused and the reflected light 12 can be turned back in the incident light proceeding direction.

In this case, the mechanism for coloring the incident light is illustrated in FIG. 7(b). The titanium dioxide-coated mica 20 composing the interfering substance layer comprises scaly mica 22 and a titanium dioxide layer 24 coating the mica 22, and some of the incident light rays 10 are reflected on the surface of the titanium dioxide layer 24 to be reflected light rays 12a, and further some others are reflected on the boundary face between the mica 22 and the titanium dioxide layer 24 to be reflected light rays 12b. The foregoing reflected light rays 12a and reflected light rays 12b have optical path length two times as long as the titanium dioxide layer 24, and among wavelength components of the reflected light rays 12a and reflected light rays 12b, those whose half-wavelength is odd number times as long as the optical path difference are amplified, and those whose wavelength is even integer number times as long as the optical path difference are attenuated. As a result, by adjusting the thickness of the titanium dioxide layer 24, reflected interference light rays 26 with desired color tone can be obtained. Incidentally, the color reflected interference light rays 26 are turned back in approximately same direction in the optical path of the incident light by the transparent small spherical bodies 18.

In the case of using such a retroreflecting material, since light rays impinge from a variety of directions under normal light and the optical path length difference attributed to the titanium dioxide layer 24 varies and as a result, the color intensified by the interference cannot be observed and appearance color of the titanium dioxide-coated mica 20 is to be observed.

On the other hand, if linear light is irradiated, since the optical path differences of the linear light become all same and therefore, only a specified color is intensified by interference and in the case of observation from the linear light irradiation direction, color produced by mixing the color intensified by interference and the appearance color of the titanium dioxide-coated mica can be observed.

Accordingly, if the layer thickness of the titanium dioxide layer is adjusted so as to make the appearance color of the titanium dioxide-coated mica and the interference color intensified by interference different, the color observed under normal light and under linear light is changed.

Incidentally, in the case of using such retroreflecting material, if drawings and patterns, letters and the like are written with the appearance color of the titanium dioxide-coated mica, and different drawings and patterns, letters and the like are appeared owing to the interference color, that makes the falsification difficult and helps to judge the real and the false, resulting in higher security.

Further, in the case of producing the forgery/alteration protective material of the invention using such a retroreflecting material, if the drawings and patterns, letters and the like coming up under linear light owing to the retroreflecting material and drawings and patterns, letters and the like coming up owing to the low transmittance layer are combined so as to provide specific information, the security is further improved and thus it is preferable.

Incidentally, as the retroreflecting material described above, titanium dioxide-coated mica is used for the interfering substance layer, however the interfering substance layer is not limited thereto.

For example, in place of mica, a powder of metal aluminum, metal titanium, a stainless steel and the like; an inorganic plate-like oxide such as plate-like iron oxide, plate-like silica, plate-like titanium oxide, plate-like alumina and the like; a laminar compound such as muscovite, biotite, sericite, kaolinite, talc and the like; a scaly powder such as organic polymer foils of a PET resin film, an acrylic resin film, and the like may be used as mother nuclei. Incidentally, in order to improve the utilization factor of the light, it is preferable to use a scaly powder with light transmittance. Further, the particle size of the powder is not particularly limited, however those with a particle size of preferably 1 to 200 μm, more preferably 10 to 120 μm and flat shape are easy to radiate beautiful gloss and interference color.

In order to provide such a powder with interference color, it is general to coat the surface of the powder with a metal oxide, and as the metal oxide, titanium dioxide, iron oxide, low valence titanium oxide, zirconium oxide, silicon oxide, aluminum oxide, cobalt oxide, nickel oxide, cobalt titanate, and compounded oxide such as $Li_2CoTi_3O_8$, $KNiTiO_x$, and mixtures of these metal oxides can be exemplified, however any metal oxide can be used without limit as long as it can exhibit interference color. Coating of the scaly powder with such metal oxides can be carried out by a method of heating organic salts or inorganic salts of these metal oxides or neutralizing and hydrolyzing them or by deposition process such as CVD and PVD.

Further, as shown above, the interfering substance layer may be formed not by using such a powder but as a metal film having interference color and obtained by oxidizing the surface of a metal film.

Incidentally, although the explanation is given by exemplifying a layer reflecting incident light by the titanium oxide-coated mica with reference to FIG. 7, the coloration of the incident light is possible even if the reflectance of the interfering substance layer is not so much high. In such a case, it is preferable to provide light reflectance to a substrate 15 so as to reflect light which is not reflected on the interfering substance layer and passes the layer by the substrate 15. On the contrary, if the interfering substance layer has sufficient reflectance, the substrate 15 is not necessarily required.

The retroreflecting material to be employed for the invention is not limited such a retroreflecting material which turning color light back in such a manner, but a common retroreflecting material can be used.

The forgery/alteration protective material of the invention comprising the layered retroreflecting material, low transmittance layer, and transparent film layer as described above is preferably stuck to or integrally formed with substrate of paper, a film or the like or an article.

Such a substrate of paper, a film or the like or an article is an object to be prevented from forgery and by sticking or integrally forming the forgery/alteration protective material of the invention and determining whether the forgery/alteration protective material of the invention is real or not, it is advantageously made possible to determine whether substrate of paper, a film or the like or an article is real or not.

Hereinafter, using some substances as materials for forming a low transmittance layer of the invention, an experiment is carried out to confirm degree of the light transmittance these materials have. Also, using same materials, forgery/alteration protective materials are practically produced and subjected to a test for determining the capability of displaying secret information.

Experiment 1

At first, an experiment was carried out using, as a material for a low transmittance layer, a silicone-based spherical powder with a particle size of 4.5 μm, a silica spherical powder with a particle size of 2 to 15 μm, a titanium oxide-coated mica, which is a material with a high light shielding property, having a particle size of 5 to 25 μm and a titanium oxide coating ratio of 57%, a titanium oxide-coated mica having a particle size of 5 to 25 μm and a titanium oxide coating ratio of 68%, and anatase type titanium oxide with a particle size of 0.3 μm. Further, a mica powder with a particle size of 5 to 25 μm was used as Comparative Example to carry out the experiment.

The experiment was carried out by using samples each obtained by dispersing 1 g of each material in 15 g of nitron using a disperser and then applying each material to an OHP sheet in application thickness of 0.05 mm, 0.101 mm, and 0.204 mm and drying the sheet at the room temperature.

The method for measuring the transmittance is carried out by measuring the intensity of light with wavelength of 400 to 700 nm passing through an OHP sheet bearing no coating by employing a spectrophotometer (UV-3410™, manufactured by HITACHI) to use the obtained transmittance as a standard of 100% and successively measuring the intensity of light passing through each sample bearing each material and calculating the transmittance index.

The results are shown in the following Tables 1, 2.

TABLE 1

| | material | | | | | | | | |
|---|---|---|---|---|---|---|---|---|---|
| | silicone-based spherical powder | | | silica spherical powder | | | titanium oxide-coated mica (coating ratio 57%) | | |
| wave-length (nm) | coating thickness (mm) | | | | | | | | |
| | 0.05 | 0.101 | 0.204 | 0.05 | 0.101 | 0.204 | 0.05 | 0.101 | 0.204 |
| 400 | 83.69 | 84.19 | 86.57 | 81.01 | 81.04 | 81.28 | 43.42 | 34.15 | 16.11 |
| 410 | 96.35 | 96.78 | 99.03 | 93.19 | 93.15 | 93.90 | 85.20 | 57.15 | 38.44 |
| 420 | 96.22 | 96.71 | 98.85 | 93.57 | 93.46 | 93.77 | 73.50 | 67.01 | 51.29 |
| 430 | 96.23 | 96.62 | 98.90 | 93.73 | 93.67 | 93.96 | 78.18 | 72.55 | 58.19 |
| 440 | 96.35 | 97.01 | 99.13 | 94.15 | 93.97 | 94.37 | 80.49 | 75.72 | 61.98 |
| 450 | 96.75 | 96.88 | 99.17 | 94.61 | 94.43 | 94.89 | 81.17 | 76.13 | 62.65 |
| 460 | 96.56 | 97.12 | 98.97 | 94.53 | 94.55 | 94.88 | 80.35 | 75.02 | 61.22 |
| 470 | 96.59 | 96.94 | 98.92 | 94.77 | 94.60 | 95.05 | 78.51 | 72.99 | 58.59 |
| 480 | 96.75 | 96.85 | 98.86 | 94.77 | 94.80 | 95.40 | 78.39 | 70.47 | 55.68 |
| 490 | 96.75 | 96.98 | 98.82 | 95.03 | 94.84 | 95.43 | 73.81 | 67.37 | 52.24 |
| 500 | 96.68 | 96.82 | 98.66 | 95.15 | 94.94 | 95.58 | 71.31 | 64.56 | 48.99 |
| 510 | 96.84 | 97.01 | 98.58 | 95.15 | 95.06 | 95.61 | 68.90 | 61.77 | 46.12 |
| 520 | 95.91 | 96.95 | 98.53 | 95.35 | 95.17 | 95.65 | 66.71 | 59.48 | 43.79 |
| 530 | 96.91 | 96.80 | 98.51 | 95.28 | 95.29 | 95.78 | 84.88 | 57.18 | 41.59 |
| 540 | 96.81 | 98.77 | 98.18 | 95.28 | 95.17 | 95.74 | 62.89 | 55.26 | 39.81 |
| 550 | 96.88 | 96.69 | 98.20 | 95.36 | 95.43 | 95.85 | 61.29 | 53.66 | 38.40 |
| 560 | 96.93 | 98.87 | 98.30 | 95.44 | 95.46 | 95.86 | 60.18 | 52.35 | 37.27 |
| 570 | 96.89 | 98.95 | 98.05 | 95.58 | 95.55 | 95.88 | 58.95 | 51.12 | 36.24 |
| 580 | 96.85 | 96.80 | 97.98 | 95.46 | 95.53 | 95.97 | 58.07 | 50.27 | 35.48 |
| 590 | 96.74 | 96.61 | 97.82 | 95.45 | 95.34 | 95.94 | 57.33 | 49.51 | 34.83 |
| 600 | 96.86 | 96.71 | 97.90 | 95.64 | 95.56 | 95.91 | 56.92 | 48.98 | 34.47 |
| 610 | 96.94 | 96.68 | 97.90 | 95.69 | 95.61 | 96.14 | 56.48 | 48.54 | 34.14 |
| 620 | 96.81 | 98.66 | 97.76 | 95.73 | 95.50 | 95.90 | 56.20 | 48.35 | 33.87 |
| 630 | 96.76 | 98.34 | 97.57 | 95.49 | 95.43 | 95.86 | 56.02 | 48.11 | 33.70 |
| 640 | 96.91 | 98.72 | 97.63 | 95.68 | 95.57 | 95.93 | 56.09 | 48.04 | 33.75 |

TABLE 1-continued

| | material | | | | | | | | |
|---|---|---|---|---|---|---|---|---|---|
| | silicone-based spherical powder | | | silica spherical powder | | | titanium oxide-coated mica (coating ratio 57%) | | |
| wave-length | coating thickness (mm) | | | | | | | | |
| (nm) | 0.05 | 0.101 | 0.204 | 0.05 | 0.101 | 0.204 | 0.05 | 0.101 | 0.204 |
| 650 | 96.70 | 98.39 | 97.20 | 95.49 | 95.54 | 96.04 | 55.97 | 47.97 | 33.67 |
| 660 | 96.64 | 98.48 | 97.58 | 95.45 | 95.60 | 95.99 | 56.01 | 47.99 | 33.79 |
| 670 | 98.95 | 98.46 | 97.58 | 95.68 | 95.49 | 96.13 | 56.11 | 48.28 | 33.87 |
| 680 | 98.91 | 98.42 | 97.38 | 95.60 | 95.39 | 95.80 | 56.22 | 48.19 | 33.98 |
| 690 | 96.85 | 98.54 | 97.55 | 95.64 | 95.75 | 96.05 | 56.47 | 48.47 | 34.01 |
| 700 | 96.61 | 98.42 | 97.49 | 95.68 | 95.59 | 96.08 | 56.42 | 48.57 | 34.05 |

TABLE 2

| | material | | | | | | | | |
|---|---|---|---|---|---|---|---|---|---|
| | titanium oxide-coated mica (coating ratio 68%) | | | anatase type titanium oxide | | | mica | | |
| wave-length | coating thickness (mm) | | | | | | | | |
| (nm) | 0.05 | 0.101 | 0.204 | 0.05 | 0.101 | 0.204 | 0.05 | 0.101 | 0.204 |
| 400 | 45.15 | 34.18 | 14.41 | 38.73 | 31.80 | 18.71 | 85.17 | 83.91 | 81.84 |
| 410 | 68.55 | 58.78 | 38.33 | 46.14 | 38.37 | 24.11 | 97.81 | 98.84 | 94.46 |
| 420 | 75.49 | 88.25 | 50.99 | 46.90 | 39.16 | 25.28 | 97.91 | 96.81 | 94.58 |
| 430 | 78.82 | 89.33 | 53.07 | 47.44 | 39.87 | 26.05 | 98.03 | 96.90 | 95.12 |
| 440 | 74.58 | 87.06 | 50.73 | 48.09 | 40.53 | 26.84 | 98.82 | 97.38 | 95.42 |
| 450 | 71.00 | 62.87 | 46.57 | 48.58 | 41.05 | 27.40 | 98.63 | 97.43 | 95.54 |
| 460 | 67.17 | 58.68 | 42.65 | 48.98 | 41.46 | 27.88 | 98.65 | 97.59 | 95.63 |
| 470 | 64.02 | 55.25 | 39.61 | 49.15 | 41.85 | 28.30 | 98.55 | 97.61 | 95.70 |
| 480 | 81.58 | 52.81 | 37.31 | 49.58 | 42.14 | 28.70 | 98.88 | 97.85 | 96.08 |
| 490 | 59.82 | 50.83 | 35.82 | 49.79 | 42.45 | 29.05 | 89.04 | 97.76 | 96.18 |
| 500 | 58.61 | 49.80 | 34.94 | 50.09 | 42.74 | 29.37 | 99.05 | 97.76 | 96.10 |
| 510 | 58.28 | 49.38 | 34.64 | 50.31 | 42.93 | 29.70 | 99.01 | 97.80 | 96.09 |
| 520 | 58.32 | 49.46 | 34.84 | 50.60 | 43.32 | 30.02 | 99.21 | 98.11 | 96.41 |
| 530 | 58.95 | 50.09 | 35.50 | 50.86 | 43.58 | 30.38 | 99.21 | 98.25 | 96.37 |
| 540 | 59.73 | 50.95 | 36.43 | 51.06 | 43.94 | 30.61 | 99.08 | 98.09 | 96.36 |
| 550 | 60.83 | 52.27 | 37.69 | 51.32 | 44.26 | 30.98 | 99.26 | 98.11 | 96.56 |
| 560 | 62.34 | 53.88 | 39.10 | 51.67 | 44.55 | 31.29 | 99.36 | 98.25 | 96.70 |
| 570 | 63.84 | 55.41 | 40.69 | 51.86 | 44.78 | 31.57 | 99.45 | 98.08 | 96.65 |
| 580 | 85.30 | 57.19 | 42.41 | 52.21 | 45.16 | 31.98 | 99.54 | 98.37 | 96.66 |
| 590 | 86.93 | 58.95 | 44.10 | 52.47 | 45.43 | 32.19 | 99.39 | 98.38 | 96.62 |
| 600 | 88.63 | 60.77 | 46.02 | 52.82 | 45.74 | 32.59 | 99.40 | 98.48 | 96.97 |
| 610 | 70.31 | 62.70 | 47.94 | 53.10 | 46.09 | 32.95 | 99.53 | 98.53 | 97.00 |
| 620 | 71.79 | 64.49 | 49.93 | 53.38 | 48.42 | 33.19 | 99.38 | 98.42 | 96.90 |
| 630 | 73.40 | 66.39 | 51.86 | 53.74 | 48.83 | 33.53 | 99.42 | 98.53 | 96.98 |
| 640 | 75.01 | 68.32 | 54.22 | 54.04 | 47.12 | 33.89 | 99.65 | 98.62 | 97.18 |
| 650 | 76.79 | 70.24 | 56.33 | 54.34 | 47.39 | 34.22 | 99.43 | 98.60 | 98.95 |
| 660 | 78.23 | 72.28 | 58.78 | 54.49 | 47.64 | 34.44 | 99.59 | 98.63 | 97.09 |
| 670 | 79.89 | 74.27 | 61.30 | 54.97 | 47.97 | 34.86 | 99.79 | 98.78 | 97.32 |
| 680 | 81.54 | 76.34 | 63.68 | 55.17 | 48.36 | 35.13 | 99.81 | 98.80 | 97.15 |
| 690 | 83.19 | 78.37 | 66.32 | 55.60 | 48.64 | 35.58 | 99.76 | 98.75 | 97.38 |
| 700 | 84.51 | 80.14 | 68.40 | 55.84 | 48.89 | 35.79 | 99.88 | 98.91 | 97.23 |

Figure 8:
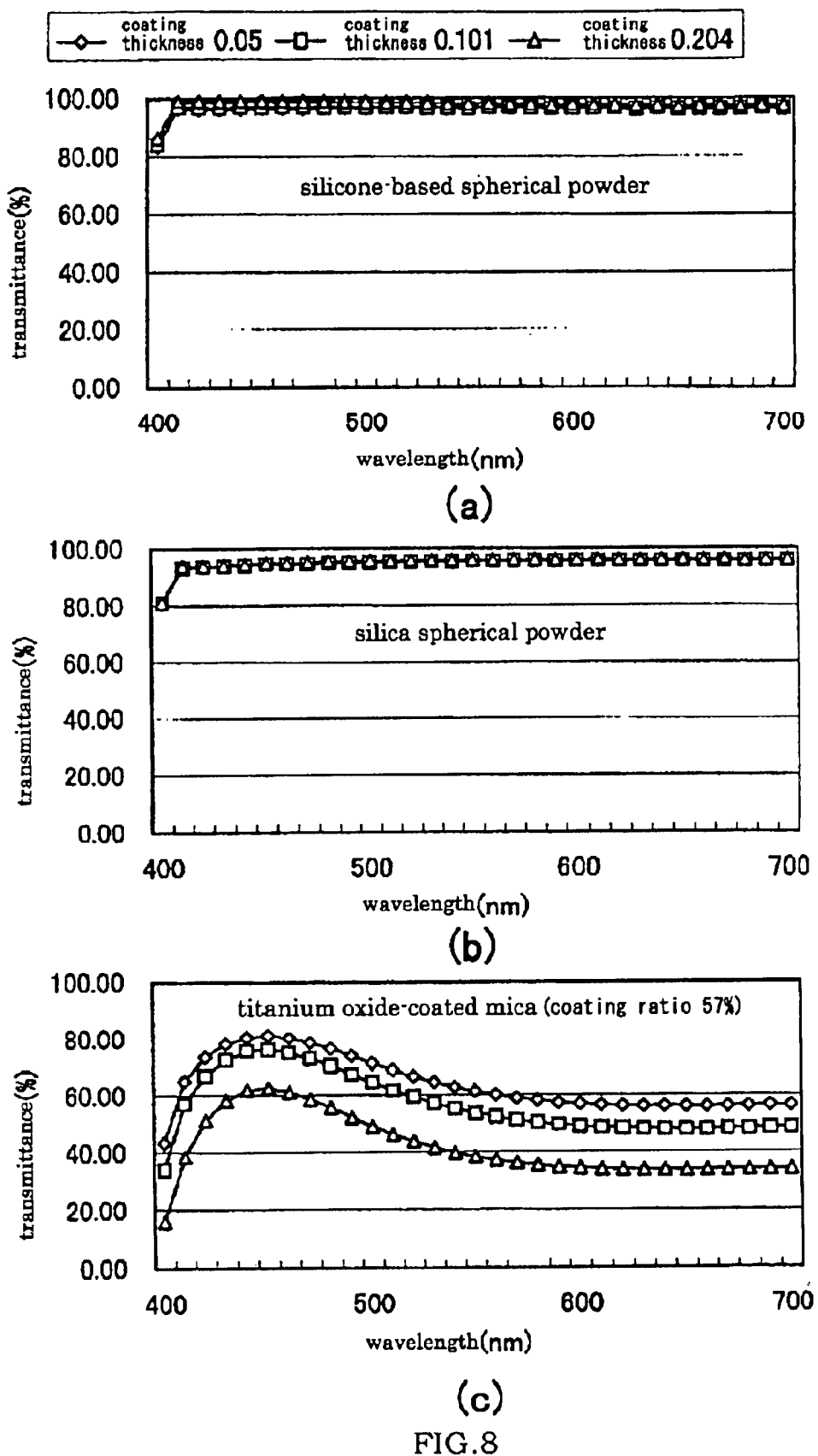
FIG. 8 is an illustration collectively showing the results of Table 1 in form of a graph.
Figure 9:
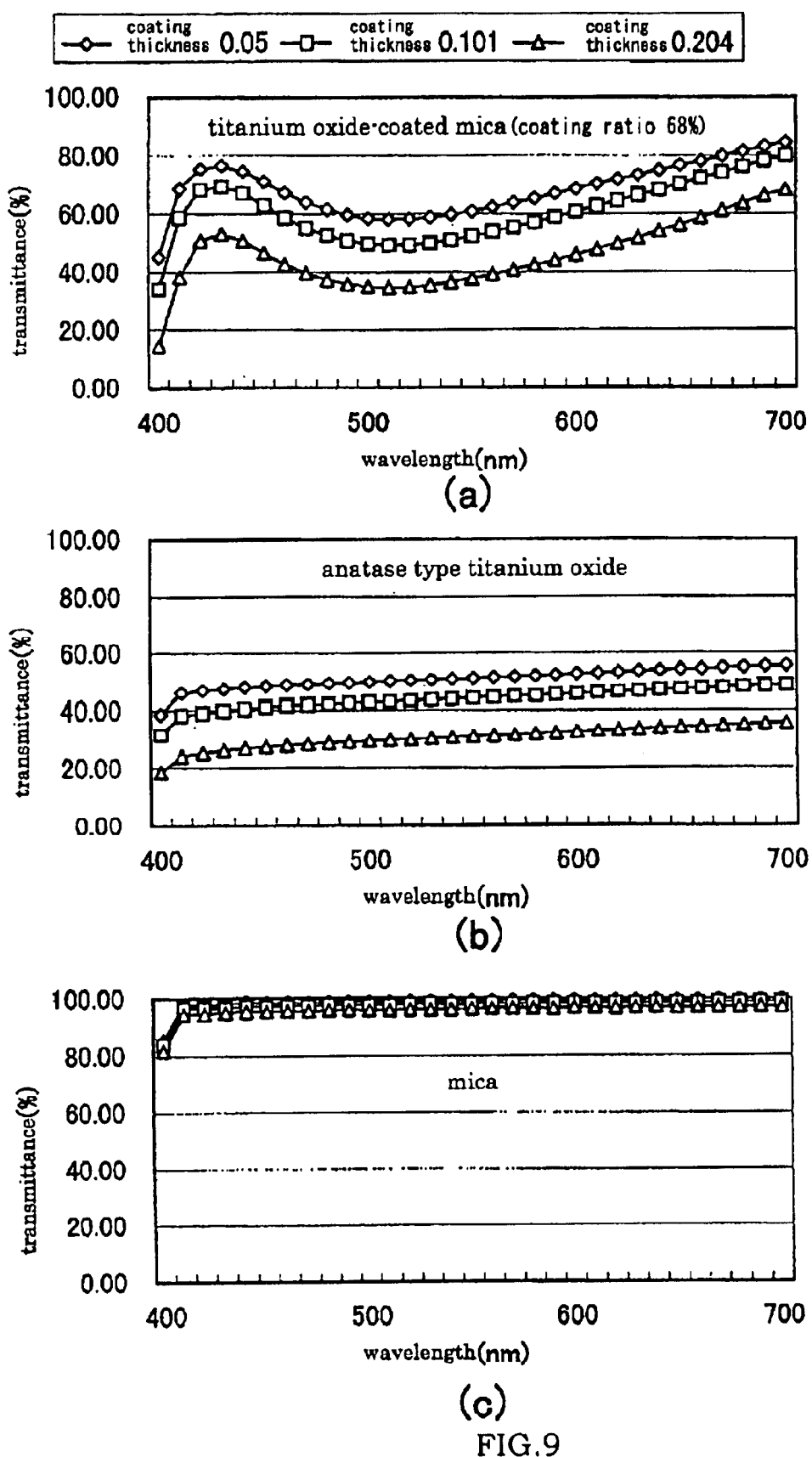
FIG. 9 is an illustration collectively showing the results of Table 2 in form of a graph.

Further, the results of the respective samples using the silicone-based spherical powder shown in Table 1 are graphed out in FIG. 8(a), the results of the sample using the silica spherical powder are graphed out in FIG. 8(b), and the results of using the titanium oxide-coated mica, having a titanium oxide coating ratio of 57% are graphed out in FIG. 8(c). Similarly, the results of using the titanium oxide-coated mica having a titanium oxide coating ratio of 68% graphed out in FIG. 9(a), the results of using the anatase type titanium oxide are graphed out in FIG. 9(b), and the results of using the mica powder are graphed out in FIG. 9(c).

As results of the Experiment 1, the silicone-based spherical powder, the silica spherical powder, and the mica powder, which is a Comparative Example, were found having extremely high light transmittance index and samples with the coating thickness values in the experiment all showed good transmittance.

On the other hand, in the case of the titanium oxide-coated mica, which is a material with a high light shielding property, when the coating thickness is 0.204 mm, the transmittance was decreased to 45% or lower.

Further, in the case of anatase type titanium oxide, even when the coating thickness is 0.101 mm, the transmittance was decreased to 45% or lower.

Experiment 2

Successively, an examination was carried out to find whether each low transmittance layer is capable of sufficiently displaying secret information under linear light by producing a forgery/alteration protective material of the invention by using each material employed for the above-mentioned experiment 1 and mica for Comparative Example.

Figure 10:
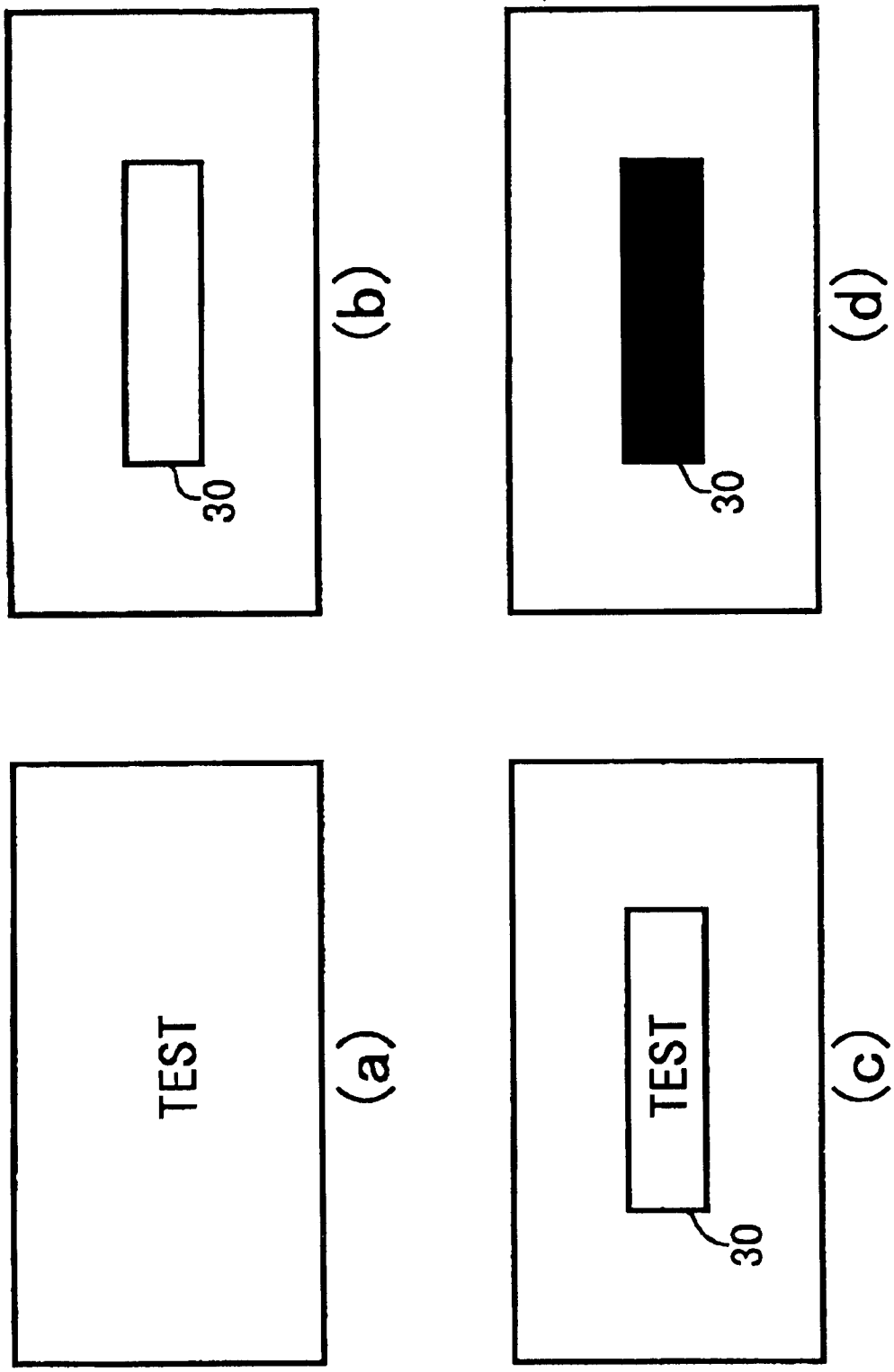
FIG. 10 is an explanatory drawing for representing the formation procedure and the measurement method for a sample in Experiment 2.

The production procedure of each sample will be described with the reference to the illustrations. A PET film in which letters are printed was layered and fixed on a commonly commercialized retroreflecting material. FIG. 10(a) shows this state.

Each sample used for the above-mentioned experiment 1 was layered thereon. As shown in FIG. 10(b), each sample was applied so as to form a rectangle 30 in the film center. Accordingly, each sample of this experiment as shown in FIG. 10(c) was formed so as to cover the letters by layering the sample on the film.

If each material used for the low transmittance layer is capable of sufficiently displaying the secret information, the low transmittance layer would be seen to be dark when linear light is irradiated, so that as shown in FIG. 10(d), the letters would not be seen or scarcely be seen.

The evaluation of the respective samples produced in such a manner was carried out by visual observation under normal light and under linear light and determining whether the letter information could be seen or not by observation under normal light and marking □ to those making letters well seen, ○ to those making letters seen, Δ to those making letters seen with difficulty and × to those making letters scarcely seen. Further, in the case of observation under linear light, evaluation was carried out by determining whether the secret information could be displayed or could not, by determining whether the letter information could be seen or would become hard to see, and marking ○ to those making display possible and × to those making display impossible.

Results are shown in Table 3.

TABLE 3

| | material | | | | | | | | |
|---|---|---|---|---|---|---|---|---|---|
| | silicone-based spherical powder | | | silica spherical powder | | | titanium oxide-coated mica (coating ratio 57%) | | |
| condi-tions | coating thickness (mm) | | | | | | | | |
| | 0.05 | 0.101 | 0.204 | 0.05 | 0.101 | 0.204 | 0.05 | 0.101 | 0.204 |
| under normal light | ◎ | ◎ | ◎ | ◎ | ◎ | ◎ | ○ | ○ | Δ |
| under linear light | ○ | ○ | ○ | ○ | ○ | ○ | ○ | ○ | ○ |

TABLE 3-continued

| | material | | | | | | | | |
|---|---|---|---|---|---|---|---|---|---|
| | titanium oxide-coated mica (coating ratio 68%) | | | anatase type titanium oxide | | | mica | | |
| conditions | coating thickness (mm) | | | | | | | | |
| | 0.05 | 0.101 | 0.204 | 0.05 | 0.101 | 0.204 | 0.05 | 0.101 | 0.204 |
| under normal light | o | o | Δ | o | Δ | x | ⊚ | ⊚ | ⊚ |
| under linear light | o | o | o | o | o | o | x | x | x |

As results of the Experiment 2, the silicone-based spherical powder and silica spherical powder with the respective coating thickness had excellent transmittance and were found capable of displaying the secret information. In the case of the titanium oxide-coated mica with a coating thickness of 0.204 mm, the letter information became difficult to see under normal light but the display of the secret information was possible regardless of the coating thickness. Similarly, in the case of anatase type titanium oxide with a coating thickness of 0.101 mm or thicker, the letter information became difficult to see under normal light but the display of the secret information was possible regardless of the coating thickness.

On the other hand, although mica had extremely high light transmittance, the secret information display was impossible. That is supposedly attributed to that since mica comprises plate-like lamellar layer, the entire shape is also plate-like and mica has insufficient light diffusibility.

Experiment 3

Based on the results of the Experiment 2, using silica powders with different shape which showed good results as a material with a high light diffusibility, the experiment was carried out by the examination method and the evaluation method similar to those of the Experiment 2. The powders employed were a silica plate-like powder with a plate-like shape and an average particle size of 5 μm and silica spherical powders with a spherical shape and average particle sizes of 5 μm and 20 μm, respectively.

The results are shown in Table 4.

TABLE 4

| | material | | | | | | | | |
|---|---|---|---|---|---|---|---|---|---|
| | silica plate-like powder | | | silica spherical powder | | | silica spherical powder | | |
| | average particle size (μm) | | | | | | | | |
| | 5 | | | 5 | | | 20 | | |
| | aspect ratio | | | | | | | | |
| | 20 | | | 1 | | | 1 | | |
| conditions | coating thickness (mm) | | | | | | | | |
| | 0.05 | 0.101 | 0.204 | 0.05 | 0.101 | 0.204 | 0.05 | 0.101 | 0.204 |
| under normal light | ⊚ | ⊚ | ⊚ | ⊚ | ⊚ | ⊚ | ⊚ | ⊚ | ⊚ |
| under linear light | x | x | x | o | o | o | o | o | o |

As results of the Experiment 3, with respect to the transmittance, silica powders with any shapes and any particle diameters all show good results regardless of the coating thickness. However, in the examination for finding whether secret information display by linear light irradiation would be possible or not, spherical powders with average particle sizes of 5 μm and 20 μm were found both capable of displaying it regardless of the coating thickness, whereas the plate-like powder was found incapable of displaying the secret information. Accordingly, it was found that as a material with a high light diffusibility, those with non-plate-like shape were preferable.

As described above, from the results of the Experiment 1, Experiment 2, Experiment 3, in the case of using the material with a high light diffusibility as the material for a low transmittance layer, those having high transparency and sufficient light diffusibility are preferable. Accordingly, as the material with a high light diffusibility, powders with high transparency and non-plate-like shape are preferable.

Further, in the case a material with a high light shielding property is used for the low transmittance layer, it is preferable to adjust the coating thickness so as to control the transmittance index 45% or high for the light with wavelength in a range of 420 nm to 700 nm.

Hereinafter, the invention will be described in details along with Examples.

EXAMPLE 1

A mixture of an acrylic resin and a cross-linking agent was applied to a transparent PET film with a thickness of 38 μm and before the resin was completely cured, glass beads with a refractive index of 1.9 and a particle size of 38 to 50 μm were scattered in one layer and heated at 120° C. for 3 minutes to fix the glass beads.

Next, a mixture of an acrylic resin and a cross-linking agent was applied to the foregoing glass beads in a proper thickness so as to obtain retroreflected light and heated at 120° C. for 3 minutes to completely cure the mixture. Further, a mixture containing 100 parts by weight of an acrylic resin (45 wt. % remaining after solvent drying) and 30 parts by weight of a titanium dioxide-coated mica (Iriodin 201™, produced by Merck Ltd.) having white appearance color and gold color as interference color was applied thereon and heated at 120° C. for 3 minutes to form an interfering substance layer. Then, on the formed interfering substance layer, a white PET with a thickness of 300 μm was thermally press-bonded to form a retroreflecting material layer.

Successively, the produced retroreflecting material was turned upside down, letters were screen-printed with black ink on the transparent PET film.

Further thereon, designed patterns and letter information were printed by a mixture of a spherical silicone powder to be a low transmittance layer and nitron.

Finally, a transparent PET film with a thickness of 19 μm and having an adhesive layer was thermally stuck to the foregoing low transmittance layer to obtain a forgery/alteration protective material of the invention.

Figure 11:
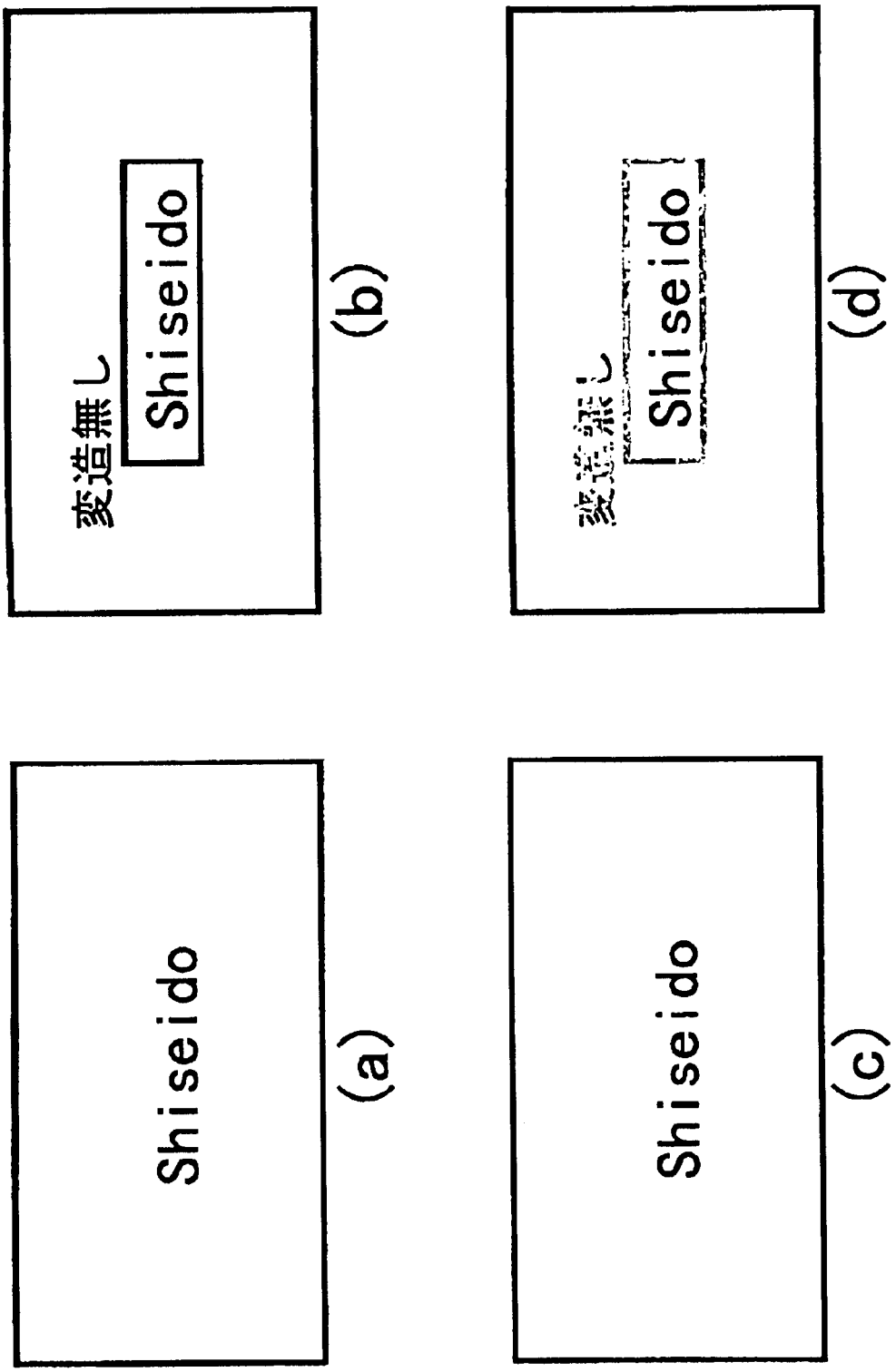
FIG. 11 is an explanatory drawing for representing the observation results observed when Example 1 is observed under the respective conditions.

When the obtained forgery/alteration protective material was observed under normal light, as shown in FIG. 11(a), letter information printed with black ink was seen. Further, the retroreflecting material was white, which is the appearance color of the titanium dioxide-coated mica. However, the low transmittance layer made of the spherical silicone powder was scarcely seen.

Next, when the obtained forgery/alteration protective material was observed under linear light, as shown in FIG. 11(b), other than letter information printed with black ink, the drawings and letters drawn by the low transmittance layer made of the spherical silicon powder were seen. In this case, the retroreflecting material exhibited gold color, which is interference color of the titanium dioxide-coated mica.

Successively, the transparent PET film in the outermost surface layer of the foregoing forgery/alteration protective material was parted and the letter information printed with black ink was altered and after the film was stuck again using an adhesive, the forgery/alteration protective material was observed.

In the case of observation under normal light, as shown in FIG. 11(c), it was seen no change in the observed state from that before the transparent PET film was parted.

However, in the case of observation under linear light, as shown in FIG. 11(d), it was found that the patterns drawn by the low transmittance layer and letters were broken and the low transmittance layer was apparently broken.

EXAMPLE 2

A forgery/alteration protective material of the invention was obtained in the same manner as Example 1, except that a titanium dioxide-coated mica (Iriodin 231™, produced by Merck Ltd.) having white appearance color and green color as interference color was used in place of the spherical silicone powder used for the low transmittance layer.

When the obtained forgery/alteration protective material was observed under normal light, letter information printed with black ink was seen. Further, the low transmittance layer was observed with clear interference color depending on the observation angle to give a remarkable excellent design property. Incidentally, the retroreflecting material showed white color, which is the appearance color of the titanium dioxide-coated mica.

Next, when the obtained forgery/alteration protective material was observed under linear light, letter information printed with black ink as well as the drawings and letters drawn by the low transmittance layer was seen. Further, the retroreflecting material showed gold, which is the interference color of the titanium dioxide-coated mica.

Further, for an examination, the transparent PET film in the outermost surface layer was parted and the letter information printed with black ink was altered and after the film was stuck again using an adhesive, the forgery/alteration protective material was observed.

In the case of observation under normal light, although letters in the low transmittance layer and drawings were found defective, twinkle interference light was radiated and the excellent design property was as it was.

However, in the case of observation under linear light, it was found that the patterns drawn by the low transmittance layer and letters were broken and the low transmittance layer was apparently broken.

EXAMPLE 3

A mixture of an acrylic resin and a cross-linking agent was applied to a transparent PET film with a thickness of 38 $\mu$m and before the resin was completely cured, glass beads with a refractive index of 1.9 and a particle size of 38 to 50 $\mu$m were scattered in one layer and heated at 120° C. for 3 minutes to fix the glass beads.

Next, a mixture of an acrylic resin and a cross-linking agent was applied to the foregoing glass beads in a proper thickness so as to obtain retroreflected light and heated at 120° C. for 3 minutes to completely cure the mixture. Further, using a variety of titanium dioxide-coated mica materials with different combinations of appearance color and interference color, a plurality of mixtures containing 100 parts by weight of an acrylic resin (45 wt. % remaining after solvent drying) and 30 parts by weight of a titanium dioxide-coated mica material to be an interfering substance layer were produced.

Then, on the foregoing acrylic resin, each of the foregoing mixtures was applied by screen printing so as to make letter information observable under normal light and letters and drawings observable under linear light, and heated at 120° C. for 3 minutes. On each interfering substance layer formed in such a manner, a white PET with a thickness of 300 $\mu$m was thermally press-bonded to form a retroreflecting material layer.

Successively, the produced retroreflecting material was turned upside down, designed patterns and letter information similar to those of the Example 1 were printed by a mixture of a spherical silicone powder to be a low transmittance layer and nitron.

Finally, a transparent PET film with a thickness of 19 $\mu$m and having an adhesive layer was thermally stuck to the foregoing low transmittance layer to obtain a forgery/alteration protective material of the invention.

Figure 12:
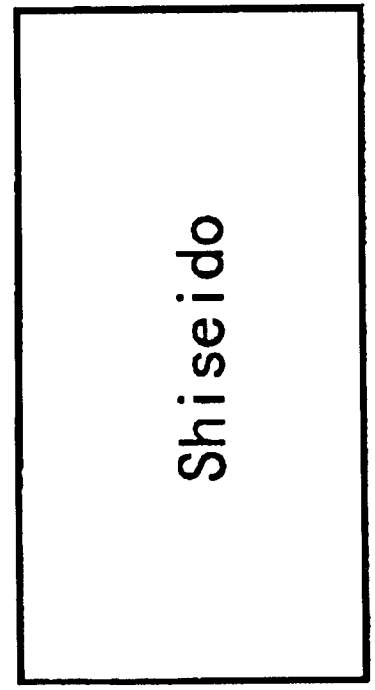
FIG. 12 is an explanatory drawing for representing, the observation results observed when Example 3 is observed under the respective conditions.
Figure 12:
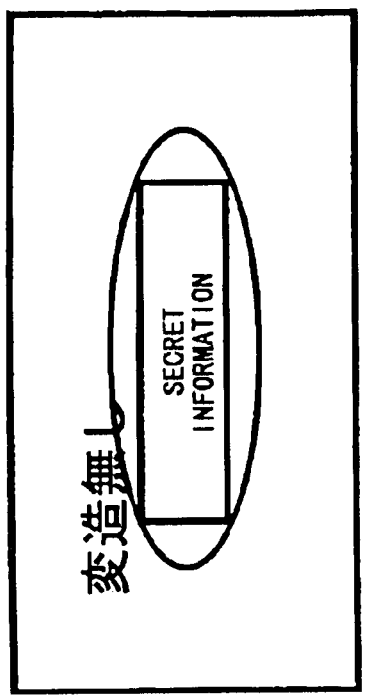
Figure 12:
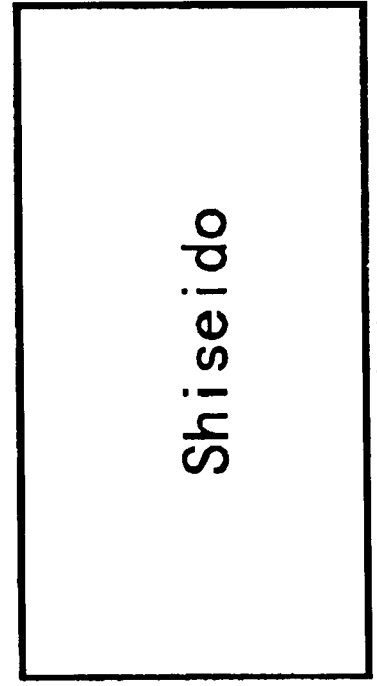
Figure 12:
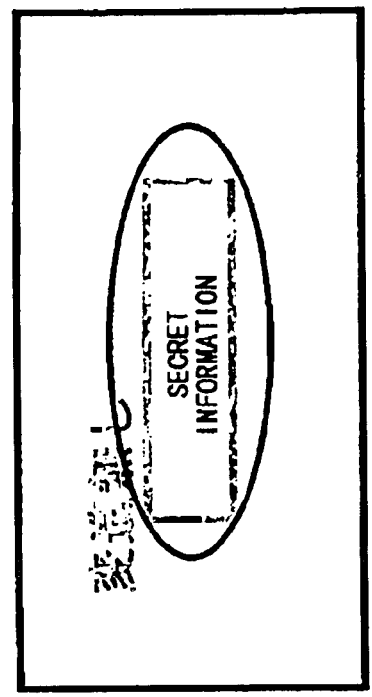

When the obtained forgery/alteration protective material was observed under normal light, as shown in FIG. 12(a), letter information printed with appearance color of the titanium dioxide-coated mica as the retroreflecting material was seen. However, the low transmittance layer made of the spherical silicone powder was scarcely seen.

Successively, when the obtained forgery/alteration protective material was observed under linear light, as shown in FIG. 12(b), letter information printed with the appearance color of the titanium dioxide-coated mica disappeared, and the drawings and letter information printed with the interference color were seen. Further the drawings and letters drawn by the low transmittance layer made of the spherical silicon powder were also seen.

The transparent PET film in the outermost surface layer of the foregoing forgery/alteration protective material was parted and the printed letter information was altered and after the film was stuck again using an adhesive, the forgery/alteration protective material was observed.

In the case of observation under normal light, as shown in FIG. 12(c), parting the transparent PET film gave no change to the observed state.

However, in the case of observation under linear light, as shown in FIG. 12(d), it was found that the patterns and letters drawn by the low transmittance layer were broken, the low transmittance layer was broken apparently. And the combinations of letters and drawing with the interference color coming up in the retroreflecting material became unbalanced to make the alteration fact clearly noticeable.

It is thus preferable, in terms of significant improvement in security, to make arrangements such that the letters and drawing information to come up on the retroreflecting material layer can be displayed together with the letters and drawing information to come up on the low trasmittance layer under linear light.

The forgery/alteration protective material of the invention is not at all limited to those described in the Examples.

Figure 13:
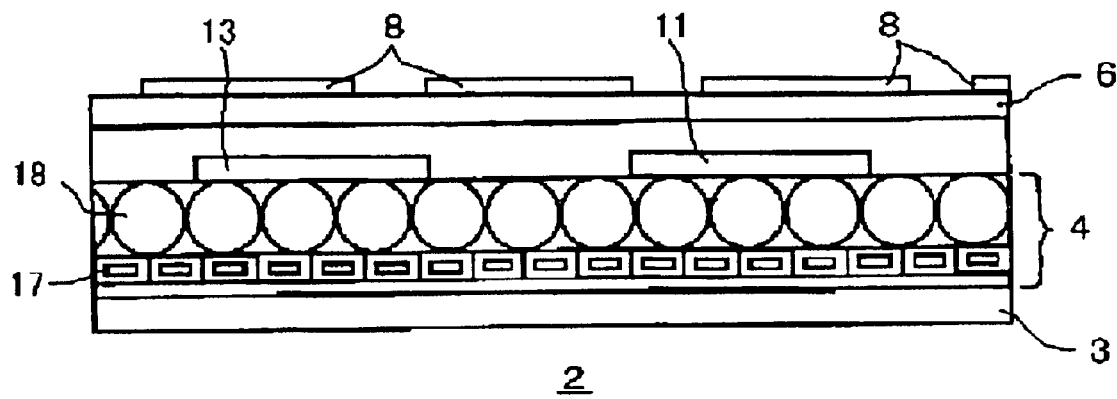
FIG. 13 is a cross-sectional view of another embodiment of a forgery/alteration protective material of the invention.
Figure 13:
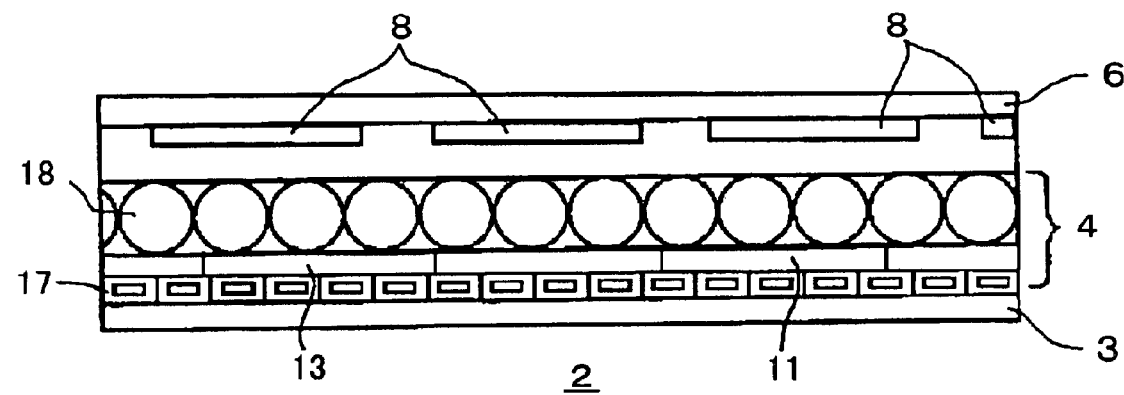
Figure 14:
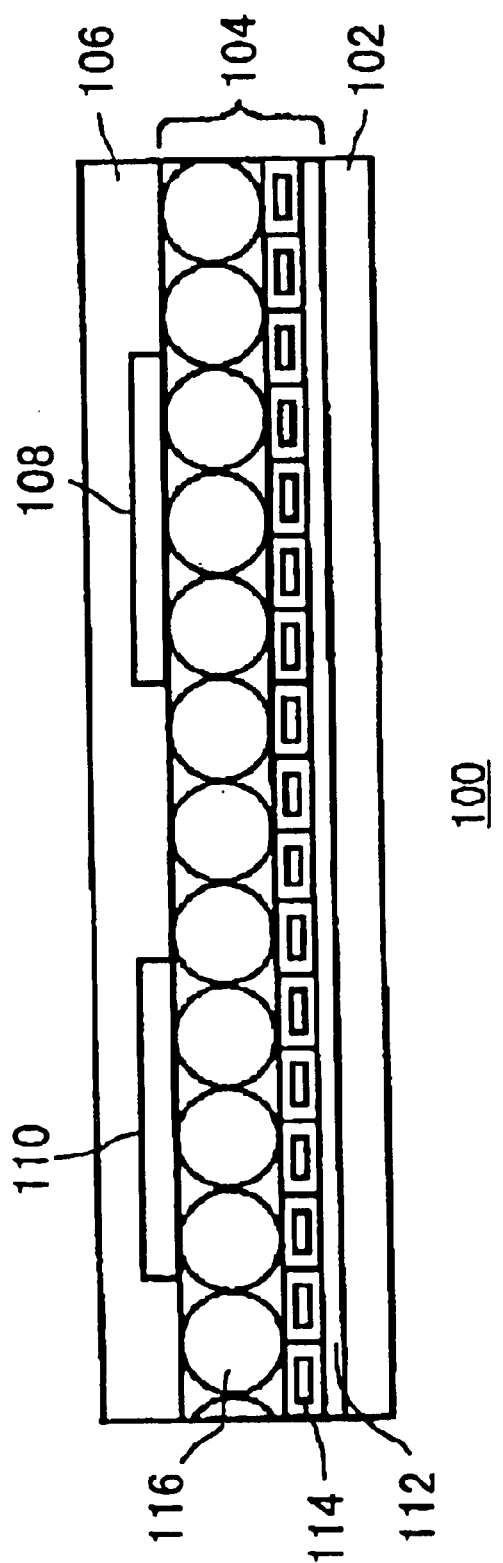
FIG. 14 is a schematic view of a conventional forgery protective material using a retroreflecting material.

For example, an embodiment having a low transmittance layer 8 formed on a transparent film layer 6 as shown in FIG. 13(a) and an embodiment having photographic information 11 and letter information 13 recorded in a retroreflecting material as shown in FIG. 13(b) may be employed. Further, it may be also possible to combine the embodiments shown in FIG. 13(a) and FIG. 13(b) to give an embodiment having a low transmittance layer 8 formed on the surface of a transparent film layer 6 and photographic information 11 and letter information 13 recorded in a retroreflecting material. The effects of the invention are obtainable even in these embodiments.

As described above, the forgery/alteration protective material of the invention makes forgery and alteration difficult and gives high security property.

What is claimed is:

1. A forgery/alteration protective material comprising
    a retroreflecting material for returning an incident light substantially along a path along which the incident light travels,
    a transparent film that is layered on said retroreflecting material, and
    a low transmittance layer between said retroreflecting material and said transparent film,
    wherein said low transmittance layer is formed of a material having a lower light transmittance than that of said transparent film, and the light transmittance of said low transmittance layer is 45% or higher to a light in a wavelength range of 420 nm to 700 nm.

2. The forgery/alteration protective material as claimed in claim 1, wherein information such as letters and/or designed patterns by printing and/or a photograph is recorded between said retroreflecting material and said low transmittance layer or in said retroreflecting material.

3. The forgery/alteration protective material as claimed in claim 1, wherein said retroreflecting material is a color light retroreflecting material for turning color light with different color tone from that of the incident light in the proceeding direction of the incident light.

4. The forgery/alteration protective material as claimed in claim 1, wherein the material with a low light transmittance for forming said low transmittance layer is a material with a high light diffusibility as compared with that of said transparent film.

5. A forgery/alteration protective material comprising:
    a retroreflecting material for returning an incident light substantially along a path along which the incident light travels,
    a transparent film that is layered on said retroreflecting material, and
    a low transmittance layer between said retroreflecting material and said transparent film,
    wherein said low transmittance layer is formed of a material having a lower light transmittance than that of said transparent film, and the light transmittance of said low transmittance layer is 45% or higher to a light in a wavelength range of 420 nm to 700 nm,
    wherein the material with a low light transmittance for forming said low transmittance layer is a material with a high light diffusibility as compared with that of said transparent film; and
    wherein said material with a high light diffusibility is a spherical inorganic powder of spherical silica or spherical alumina or a spherical resin powder of spherical polymethyl methacrylate, spherical polyethylene or spherical silicone.

6. The forgery/alteration protective material as claimed in claim 1, wherein the material with a low light transmittance for forming the low transmittance layer is a material with a high light shielding property as compared with that of the transparent film.

7. The A forgery/alteration protective material as claimed in claim 6, wherein said material with a high light shielding property is an inorganic substance selected from titanium oxide, zinc oxide, iron oxide, or titanium oxide-coated mica or a metal selected from aluminum or gold.

8. A forgery/alteration protective material as claimed in claim 1, wherein said material is stuck to or integrally formed in a substrate of paper or a film or an article.

9. A forgery/alteration protective material comprising
    a retroreflecting material for returning an incident light substantially along a proceeding direction along which the incident light travels,
    a transparent film that is layered on said retroreflecting material, and
    a low transmittance layer on a surface of said transparent film,
    wherein the low transmittance layer is formed of a material having a lower light transmittance than that of said transparent film, and the light transmittance of said low transmittance layer is 45% or higher to a light in a wavelength range of 420 nm to 700 nm.

10. A forgery/alteration protective material as claimed in claim 9, wherein information, that is a letter, a designed pattern by printing, a photograph, or both, is recorded in said retroreflecting material.

11. A forgery/alteration protective material as claimed in claim 9, wherein said retroreflecting material is a color light retroreflecting material for turning color light with different color tone from that of the incident light in the proceeding direction of the incident light.

12. A forgery/alteration protective material as claimed in claim 9, wherein the material with a low light transmittance for forming said low transmittance layer is a material with a high light diffusibility as compared with that of said transparent film.

13. A forgery/alteration protective material as claimed in claim 12, wherein said material with a high light diffusibility is a spherical inorganic powder of spherical silica or spherical alumina or a spherical resin powder of spherical polymethyl methacrylate, spherical polyethylene or spherical silicone.

14. A forgery/alteration protective material as claimed in claim 9, wherein the material with a low light transmittance for forming the low transmittance layer is a material with a high light shielding property as compared with that of the transparent film.

15. A forgery/alteration protective material as claimed in claim 14, wherein said material with a high light shielding property is an inorganic substance selected from titanium oxide, zinc oxide, iron oxide, or titanium oxide-coated mica or a metal selected from aluminum or gold.

16. A forgery/alteration protective material as claimed in claim 9, wherein said material is stuck to or integrally formed in a substrate of paper or a film or an article.

17. A forgery/alteration protective material comprising
    a retroreflecting material for returning an incident light substantially along a proceeding direction along which the incident light travels,
    a transparent film that is layered on said retroreflecting material, and a low transmittance layer between said retroreflecting material and said transparent film or on the surface of said transparent film, wherein the low transmittance layer is formed of a material having a lower light transmittance and higher light diffusibility than that of said transparent film, said material is a spherical inorganic powder of spherical silica or spherical alumina or a spherical resin powder of spherical polymethyl methacrylate, spherical polyethylene or spherical silicone.

18. The forgery/alteration protective material according to claim 1, wherein said low transmittance layer is adapted to attach to said transparent film in a way such that a breaking of said low transmittance layer simultaneously coincides with a breaking and peeling of said transparent film.

19. The forgery/alteration protective material according to claim 1, wherein said retroreflecting material has an interfering substance layer which comprises a titanium dioxide-coated mica layer.

20. The forgery/alteration protective material according to claim 19, wherein said retroreflecting material further comprises a transparent small spherical body.

* * * * *